United States Patent
Wang et al.

(10) Patent No.: US 11,996,974 B2
(45) Date of Patent: May 28, 2024

(54) ALARM ANALYSIS METHOD AND RELATED DEVICE

(71) Applicant: Huawei Technologies Co., Ltd., Shenzhen (CN)

(72) Inventors: Shanshan Wang, Shanghai (CN); Rui Ju, Shanghai (CN); Yan Wei, Shanghai (CN); Yinzhou Guo, Xi'an (CN); Ruiming Long, Guangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 17/534,632

(22) Filed: Nov. 24, 2021

(65) Prior Publication Data
US 2022/0086036 A1  Mar. 17, 2022

Related U.S. Application Data

(63) Continuation of application No. PCT/CN2020/091938, filed on May 22, 2020.

(30) Foreign Application Priority Data

May 25, 2019  (CN) .......................... 201910442803.5

(51) Int. Cl.
*H04L 41/0631* (2022.01)
*H04L 41/0677* (2022.01)

(52) U.S. Cl.
CPC ...... *H04L 41/0636* (2013.01); *H04L 41/0677* (2013.01)

(58) Field of Classification Search
CPC . H04L 41/0636; H04L 41/0677; H04L 41/16; H04L 41/0631
See application file for complete search history.

(56) References Cited

U.S. PATENT DOCUMENTS

| | | | |
|---|---|---|---|
| 7,058,707 B1 * | 6/2006 | Cerami | H04L 69/40 709/229 |
| 10,771,323 B2 | 9/2020 | Wang et al. | |
| 10,999,155 B2 * | 5/2021 | Yeung | H04L 41/0897 |

(Continued)

FOREIGN PATENT DOCUMENTS

| | | |
|---|---|---|
| CN | 101997709 A | 3/2011 |
| CN | 103346912 A | 10/2013 |

(Continued)

*Primary Examiner* — Jay P Patel
(74) *Attorney, Agent, or Firm* — SLATER MATSIL, LLP

(57) ABSTRACT

An alarm analysis method, including determining M alarm pairs in a first alarm set, where each alarm pair of the M alarm pairs includes a first alarm and a second alarm having an association, generating, according to an association rule, a first feature set of N alarm pairs, the first alarm of each alarm pair of the N alarm pairs being an alarm pair root in the first feature set, the first feature set including a first probability that a first subsystem to which each first alarm belongs is a subsystem root and a first alarm object is an alarm object root and a second probability that a second subsystem to which each second alarm belongs is a subsystem root and a second alarm object is an alarm object root, and determining root information of the first alarm set based on the first probability and the second probability.

20 Claims, 16 Drawing Sheets

| Alarm X | Alarm Y | Alarm type of the alarm X | Alarm type of the alarm Y | Object type of the alarm X | Object type of the alarm Y | Probability that a subsystem to which the alarm X belongs is a root | Probability that the object type of the alarm X is a root |
|---|---|---|---|---|---|---|---|
| "alm 1" | "alm 0" | OSS_1 | OSS_0 | OBJ_1 | OBJ_0 | P0 | P0' |
| "alm 2" | "alm 0" | OSS_2 | OSS_0 | OBJ_2 | OBJ_0 | P1 | P1' |
| "alm 3" | "alm 0" | OSS_3 | OSS_0 | OBJ_3 | OBJ_0 | P2 | P2' |
| "alm 4" | "alm 0" | OSS_4 | OSS_0 | OBJ_4 | OBJ_0 | P3 | P3' |

(56) References Cited

U.S. PATENT DOCUMENTS

| | | | | |
|---|---|---|---|---|
| 2002/0073355 A1* | 6/2002 | Cerami | ............. | H04N 21/6125 |
| | | | | 714/4.3 |
| 2002/0078017 A1* | 6/2002 | Cerami | ............... | H04L 41/5074 |
| 2003/0074440 A1 | 4/2003 | Grabarnik et al. | | |
| 2005/0146426 A1 | 7/2005 | Pereira et al. | | |
| 2010/0103823 A1* | 4/2010 | Goerge | ................ | H04L 41/046 |
| | | | | 370/242 |
| 2015/0195171 A1* | 7/2015 | Mermoud | ............ | H04L 43/106 |
| | | | | 370/253 |
| 2017/0063599 A1 | 3/2017 | Wu et al. | | |
| 2019/0132211 A1* | 5/2019 | Yeung | .................... | H04L 67/10 |
| 2019/0213504 A1* | 7/2019 | Vasseur | .................. | H04L 41/16 |
| 2019/0215230 A1* | 7/2019 | Mermoud | .......... | H04L 41/0677 |
| 2020/0259700 A1* | 8/2020 | Bhalla | ..................... | H04L 41/16 |

FOREIGN PATENT DOCUMENTS

| | | | | |
|---|---|---|---|---|
| CN | 104348667 A | | 2/2015 | |
| CN | 106170947 A | | 11/2016 | |
| CN | 108156037 A | | 6/2018 | |
| CN | 108600009 A | | 9/2018 | |
| CN | 108768753 A | | 11/2018 | |
| CN | 109450677 A | | 3/2019 | |
| CN | 110086640 B | * | 1/2022 | ......... H04L 41/0803 |
| EP | 1521396 A2 | | 4/2005 | |
| EP | 2566103 A1 | * | 3/2013 | ........... H04L 41/065 |
| EP | 2392099 B1 | * | 10/2017 | ......... H04L 41/0663 |
| GB | 2406741 A | | 4/2005 | |
| WO | WO-2013149870 A1 | * | 10/2013 | ......... H04L 41/0654 |
| WO | WO-2016119436 A1 | * | 8/2016 | ............ H04L 41/00 |
| WO | WO-2019084226 A1 | * | 5/2019 | ......... H04L 41/0816 |
| WO | WO-2020163559 A1 | * | 8/2020 | ........... G06F 3/0482 |

\* cited by examiner

| Alarm X | Alarm Y | Subsystem to which the alarm X belongs | Subsystem to which the alarm Y belongs | MO object of the alarm X | MO object of the alarm Y |
|---|---|---|---|---|---|
| "alm 1" | "alm 0" | OSS_1 | OSS_0 | OBJ_1 | OBJ_0 |
| "alm 2" | "alm 0" | OSS_2 | OSS_0 | OBJ_2 | OBJ_0 |
| "alm 3" | "alm 0" | OSS_3 | OSS_0 | OBJ_3 | OBJ_0 |
| "alm 4" | "alm 0" | OSS_4 | OSS_0 | OBJ_4 | OBJ_0 |

| Alarm X | Alarm Y | Alarm type of the alarm X | Alarm type of the alarm Y | Object type of the alarm X | Object type of the alarm Y | Probability that a subsystem to which the alarm X belongs is a root | Probability that the object type of the alarm X is a root |
|---------|---------|---------------------------|---------------------------|----------------------------|----------------------------|---------------------------------------------------------------------|-----------------------------------------------------------|
| "alm 1" | "alm 0" | OSS_1 | OSS_0 | OBJ_1 | OBJ_0 | P0 | P0' |
| "alm 2" | "alm 0" | OSS_2 | OSS_0 | OBJ_2 | OBJ_0 | P1 | P1' |
| "alm 3" | "alm 0" | OSS_3 | OSS_0 | OBJ_3 | OBJ_0 | P2 | P2' |
| "alm 4" | "alm 0" | OSS_4 | OSS_0 | OBJ_4 | OBJ_0 | P3 | P3' |

| NE TYPE | Alarm Source | Alarm ID | Occurrence Time | Clear Time | Location Info | Alarm Type | ObjType |
|---|---|---|---|---|---|---|---|
| BTS3900 LTE | 1 | 1 | 99744 | 103413 | eNodeB name=Wudian HL1H, X2 interface identifier=4294967295, operator index=65535, description information=NULL, and specific problem=there is a fault in a bottom-layer link | Communication system | Board |
| BSC6900 UMTS | 46 | 2 | 720130603 | 720131372 | | Hardware system | SCTLink |
| BSC6900 UMTS | 82 | 3 | 720130604 | 720131060 | | Operation system | RRU |
| BTS3900 WCDMA | 152 | 4 | 720130605 | 720131252 | | Communication system | Board |
| BTS3900 WCDMA | 100 | 5 | 720130606 | 720131592 | | Hardware system | Cell |

FIG. 14

ALARM ANALYSIS METHOD AND RELATED DEVICE

CROSS-REFERENCE TO RELATED APPLICATIONS

This application is a continuation of International Application No. PCT/CN2020/091938, filed on May 22, 2020, which claims priority to Chinese Patent Application No. 201910442803.5, filed on May 25, 2019. The disclosures of the aforementioned applications are hereby incorporated by reference in their entireties.

TECHNICAL FIELD

This application relates to the field of communication network management, and in particular, to an alarm analysis method and a related device.

BACKGROUND

With the increasing scale of a telecommunications network, a networking structure of the telecommunications network is complex, and hardware devices and software modules included in the network are various. In a running process of the network, the various hardware devices and software modules generate a large quantity of alarms every day. For example, for alarms such as a signal degrade indication and an output signal loss and for a condition in which an alarm is generated because a network element in an element management system (EMS) is unreachable due to optical-cable blocking, once a fault occurs in the telecommunications network, a location, a type, and a cause of the fault need to be quickly and accurately determined, and the fault needs to be quickly rectified. However, because there is a mutual triggering relationship between alarms, one alarm may trigger a large quantity of correlative alarms. In addition, many correlative alarm sequences are complexly superimposed, and there is distorted data or noise data. Consequently, difficulty of alarm association analysis and complexity of root fault locating are increased.

Currently, an intelligent fault analysis method that is based on an alarm association rule is mainly used for the alarm association analysis and the root fault locating, to assist operations and maintenance personnel in analyzing and processing alarm data. In the intelligent fault analysis method, domain-specific knowledge is included in a rule set, and a problem is analyzed and determined by using an inference mechanism. In this way, the alarm association analysis is realized. This method has a practical effect on an association of a single-device level.

However, a manual analysis process in an existing solution leads to occupation of a large quantity of operations and maintenance personnel and relatively low efficiency, and is prone to cause a data consistency problem. In an intelligent analysis process, only the association of the single-device level is involved. In addition, an alarm data processing amount and automatic fault locating accuracy far fall short of an actual requirement of telecommunication operation, and mining of the association rule is insufficient. The alarm association rule is mainly provided by a professional fault processing expert and cannot be automatically updated. Maintenance costs of an association rule library are relatively high. In addition, because the association rule generally implicitly includes descriptions of a network structure, a device function, and the like, generalization and universality of the rule are insufficient, and it is difficult to flexibly adjust and maintain the rule based on a change of a topology structure or configuration.

Therefore, how to efficiently analyze an alarm association and accurately locate a root alarm becomes an urgent problem to be resolved.

SUMMARY

A technical problem to be solved in embodiments of the present invention is to provide an alarm analysis method and a related device, to efficiently analyze an association between alarms and accurately locate a root alarm.

According to a first aspect, an embodiment of the present invention provides an alarm analysis method. The method may include determining M alarm pairs in a first alarm set, where each of the M alarm pairs includes a first alarm and a second alarm between which an association exists, and M is an integer greater than 0, generating, according to an association rule, a first feature set of N alarm pairs, in which the first alarm is used as an alarm pair root, in the M alarm pairs, where the first feature set includes a first probability that a first subsystem to which each first alarm in the N alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, where N is an integer greater than 0 and less than M, and determining root information of the first alarm set based on the first probability and the second probability, where the root information includes one or more of a root alarm, a root subsystem, and a root alarm object in the first alarm set.

In this embodiment of the present invention, on a basis that an association between alarms is clear, a probability that an alarm in an alarm pair is a root alarm is mined based on information such as a subsystem included in the alarm and an object that generates the alarm, and the root alarm is further predicted based on alarm feature data such as an association between resource instances to which the alarms belong. That is, association analysis and root cause inference are performed from a plurality of dimensions such as a service association logic and historical alarm data, thereby improving efficiency and accuracy of alarm analysis and the root cause. Different from a conventional technology in which the alarm is analyzed by directly using an obtained association rule, in this embodiment of the present invention, after the alarm is analyzed based on the obtained association rule, the alarm association rule is further used to extract a key feature of the alarm set, so that alarm analysis efficiency can be improved, and system-level and device-level association analysis can further be implemented, thereby satisfying an actual requirement of telecommunication operation.

In a possible implementation, the generating, according to an association rule, a first feature set of N alarm pairs, in which the first alarm is used as an alarm pair root, in the M alarm pairs includes determining an alarm pair root of each of the M alarm pairs according to the association rule, counting a quantity of times for which the first subsystem is the subsystem root and the first alarm object is the alarm object root, to calculate the first probability, and counting a quantity of times for which the second subsystem is the subsystem root and the second alarm object is the alarm object root, to calculate the second probability, and obtaining the first feature set of the N alarm pairs in which the first alarm is used as the alarm pair root. In this embodiment of the present invention, the alarm pair root of each alarm pair is determined by using the association rule, and the first probability and the second probability of each alarm pair are calculated, to obtain the alarm feature data corresponding to each alarm pair. Then one or more alarm pairs in which the first alarm is used as the alarm pair root are filtered from the M alarm pairs, to generate the first feature set. The association rule is fully used, and the key feature of the alarm pair is mined. The probability is counted, so that the association (or a dependency relationship) between the subsystems included in the alarm and the association between the alarm objects can be effectively analyzed. The obtained first feature set helps subsequently perform processing based on a classification algorithm, to more effectively determine the root alarm.

In a possible implementation, the method further includes determining a third subsystem to which a third alarm belongs and a third alarm object corresponding to the third alarm, and a fourth subsystem to which a fourth alarm belongs and a fourth alarm object corresponding to the fourth alarm, where the third alarm and the fourth alarm are any two alarms in a second alarm set, generating a second feature set of the M alarm pairs according to the association rule, where the second feature set includes a first probability that a first subsystem to which each first alarm in the M alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, determining, based on the second feature set, a first association between the third subsystem and the fourth subsystem and a second association between the third alarm object and the fourth alarm object, and determining, based on the first association and the second association, whether there is an association between the third alarm and the fourth alarm. In this embodiment of the present invention, the dependency relationship between the determined subsystems and the dependency relationship between the alarm objects are used to determine the association between the to-be-predicted alarms, so that a method of analyzing the association between the alarms is added, and efficiency of alarm analysis and root inference is improved.

In a possible implementation, the root information includes the root alarm, the root subsystem, and the root alarm object in the first alarm set, and the determining root information of the first alarm set based on the first probability and the second probability includes calculating the first probability and the second probability and performing classification on the first alarm set by using the first feature set as a training data set of a random forest algorithm, to obtain the root alarm, the root subsystem, and the root alarm object. In this embodiment of the present invention, the random forest algorithm is used to classify the data obtained by performing mining again based on the rule, to use the data as the training set to determine the root alarm. This reduces a manual analysis process, improves efficiency of root alarm inference, and helps facilitate locating and investigating a fault in the telecommunications network.

In a possible implementation, the determining M alarm pairs in a first alarm set includes determining the M alarm pairs in the first alarm set according to the association rule, where each alarm in the first alarm set includes a subsystem to which the alarm belongs and an alarm object corresponding to the alarm. In this embodiment of the present invention, the association between the alarms in the first alarm set is analyzed according to the association rule, to obtain the M alarm pairs. The association rule is obtained by accumulating expert knowledge and by learning based on the alarm association analysis. This ensures a relatively strong association between the two alarms in the alarm pair, and clears a correlative relationship between the alarms. Association analysis is a basis for accurate alarm analysis.

In a possible implementation, before the determining the M alarm pairs in the first alarm set according to the association rule, the method further includes converting an alarm field of each raw alarm in a raw alarm set corresponding to the first alarm set into an integer field, where the alarm field includes one or more of an alarm object, an alarm source, alarm raised time, and alarm clear time, filtering out a raw alarm whose alarm field is an invalid integer field, to obtain L standardized alarms, where L is an integer greater than 0, and determining a third alarm set, where the third alarm set includes the L standardized alarms. In this embodiment of the present invention, the invalid alarm is filtered out by preprocessing the raw alarms. By preprocessing alarm data, a quantity of the alarms in the raw alarm set is preliminarily reduced, a data processing amount is reduced, and the alarm analysis efficiency is improved.

In a possible implementation, the standardized alarm includes a network element type, and after the determining a third alarm set, the method includes performing sliding window modeling on the L standardized alarms, to obtain a frequent alarm subsequence set of K network element types, where K is an integer greater than 0, and the frequent alarm subsequence set includes a frequent one-item alarm subsequence set and a frequent two-item alarm subsequence set, and generating the association rule based on an alarm subsequence whose confidence is greater than a preset threshold in the frequent two-item alarm subsequence set and a preset filtering method. In this embodiment of the present invention, frequent alarm subsequences are filtered based on confidence of the frequent alarm subsequences, so that on a basis that a large quantity of alarms are effectively processed, a large quantity of useless association rules are prevented from being output in a data mining process, thereby improving reliability of the association rule. By using the more accurate association rule, the alarm is analyzed and the alarm feature is extracted.

In a possible implementation, the standardized alarm further includes the alarm source and the alarm raised time, and the performing sliding window modeling on the L standardized alarms, to obtain a frequent alarm subsequence set of K network element types includes obtaining, based on network element types and alarm sources of the L standardized alarms, fifth alarms sent by same alarm sources of a same network element type, sorting the fifth alarms in ascending order based on alarm raised time of each of the fifth alarms, obtaining P alarm sequences based on a preset sliding window width and a sliding step by using a constructed sliding window, where the alarm sequence includes one or more fifth alarms in the same sliding window, and P is an integer greater than 0, counting a quantity of times for which an alarm subsequence included in the P alarm sequences occurs, to obtain a frequent alarm subsequence set of the same alarm sources, and separately accumulating frequent alarm subsequence sets of different alarm sources of the same network element type, to obtain the frequent alarm subsequence set of the K network element types. In this embodiment of the present invention, the frequent alarm subsequence set is obtained by performing sliding window modeling, so that a series of alarms in same duration are processed in a centralized manner, and accuracy and processing efficiency of the alarm data processing are improved.

In a possible implementation, the preset filtering method includes calculating first confidence of a first association rule and second confidence of a second association rule, where the first association rule and the second association rule are one or more pairs of association rules corresponding to a same alarm, and comparing the first confidence and the second confidence, to use an association rule whose confidence is greater as the association rule. In this embodiment of the present invention, the association rule whose confidence is greater (that is, a priority of the association rule is higher) is retained based on confidence of one or more pairs of association rules corresponding to the same alarm, so that a redundant rule is processed, a quantity of rules is reduced, and the association rule that is more accurate and more effective is retained. This helps subsequently use the association rule effectively, and analyze the alarm and extract a key feature of the alarm more effectively.

In a possible implementation, the alarm field further includes alarm location information, and the preset filtering method includes calculating first confidence of a first association rule and second confidence of a second association rule, where the first association rule and the second association rule are a plurality of pairs of association rules corresponding to a same alarm, comparing the first confidence and the second confidence, to obtain a plurality of third association rules whose confidence is greater in the first confidence and the second confidence, determining whether an alarm pair corresponding to a fourth association rule in the plurality of third association rules has the same alarm location information, where the fourth association rule is an association rule in which there is an association between each alarm in the corresponding alarm pair and a same alarm, if the alarm pair does not have the same alarm location information, suppressing the fourth association rule, and obtaining a plurality of third association rules other than the suppressed fourth association rule, to use the plurality of third association rules as the association rule. In this embodiment of the present invention, the redundant rule in the target rule is first processed, and then rule suppression processing is performed, and finally, a remaining rule is output as the final association rule. After the redundant rule is processed, and rule suppression processing is performed, the association rule is output, so that quality of the association rule is improved, the redundant rule is reduced, rule filtering efficiency is improved, and efficiency and accuracy of the alarm analysis are improved.

According to a second aspect, an embodiment of the present invention provides an alarm analysis apparatus. The apparatus may include a determining unit, configured to determine M alarm pairs in a first alarm set, where each of the M alarm pairs includes a first alarm and a second alarm between which an association exists, and M is an integer greater than 0, a generation unit, configured to generate, according to an association rule, a first feature set of N alarm pairs, in which the first alarm is used as an alarm pair root, in the M alarm pairs, where the first feature set includes a first probability that a first subsystem to which each first alarm in the N alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, where N is an integer greater than 0 and less than M, and an analysis unit, configured determine root information of the first alarm set based on the first probability and the second probability, where the root information includes one or more of a root alarm, a root subsystem, and a root alarm object in the first alarm set.

In a possible implementation, the generation unit is specifically configured to determine an alarm pair root of each of the M alarm pairs according to the association rule, count a quantity of times for which the first subsystem is the subsystem root and the first alarm object is the alarm object root, to calculate the first probability, and count a quantity of times for which the second subsystem is the subsystem root and the second alarm object is the alarm object root, to calculate the second probability, and obtain the first feature set of the N alarm pairs in which the first alarm is used as the alarm pair root.

In a possible implementation, the apparatus further includes a reverse inference unit, configured to determine a third subsystem to which a third alarm belongs and a third alarm object corresponding to the third alarm, and a fourth subsystem to which a fourth alarm belongs and a fourth alarm object corresponding to the fourth alarm, where the third alarm and the fourth alarm are any two alarms in a second alarm set, generate a second feature set of the M alarm pairs according to the association rule, determine, based on the second feature set, a first association between the third subsystem and the fourth subsystem and a second association between the third alarm object and the fourth alarm object, and determine, based on the first association and the second association, whether there is an association between the third alarm and the fourth alarm.

In a possible implementation, the root information includes the root alarm, the root subsystem, and the root alarm object in the first alarm set, and the analysis unit is specifically configured to calculate the first probability and the second probability and perform classification on the first alarm set by using the first feature set as a training data set of a random forest algorithm, to obtain the root alarm, the root subsystem, and the root alarm object.

In a possible implementation, the determining unit is specifically configured to determine the M alarm pairs in the first alarm set according to the association rule, where each alarm in the first alarm set includes a subsystem to which the alarm belongs and an alarm object corresponding to the alarm.

In a possible implementation, the apparatus further includes a preprocessing unit, configured to before the M alarm pairs are determined in the first alarm set according to the association rule, convert an alarm field of each raw alarm in a raw alarm set corresponding to the first alarm set into an integer field, where the alarm field includes one or more of an alarm object, an alarm source, alarm raised time, and alarm clear time, filter out a raw alarm whose alarm field is an invalid integer field, to obtain L standardized alarms, where L is an integer greater than 0, and determine a third alarm set, where the third alarm set includes the L standardized alarms.

In a possible implementation, the standardized alarm includes a network element type, and the apparatus further includes a rule analysis unit, including a sequence counting unit and a rule generation unit, where the sequence counting unit is configured to perform, after the third alarm set is determined, sliding window modeling on the L standardized alarms, to obtain a frequent alarm subsequence set of K network element types, where K is an integer greater than 0, and the frequent alarm subsequence set includes a frequent one-item alarm subsequence set and a frequent two-item alarm subsequence set, and the rule generation unit is configured to generate the association rule based on an alarm subsequence whose confidence is greater than a preset threshold in the frequent two-item alarm subsequence set and a preset filtering method.

In a possible implementation, the standardized alarm further includes the alarm source and the alarm raised time, and the sequence counting unit is specifically configured to obtain, based on network element types and alarm sources of the L standardized alarms, fifth alarms sent by same alarm sources of a same network element type, sort the fifth alarms in ascending order based on alarm raised time of each of the fifth alarms, obtain P alarm sequences based on a preset sliding window width and a sliding step by using a constructed sliding window, where the alarm sequence includes one or more fifth alarms in the same sliding window, and P is an integer greater than 0, count a quantity of times for which an alarm subsequence included in the P alarm sequences occurs, to obtain a frequent alarm subsequence set of the same alarm sources, and separately accumulate frequent alarm subsequence sets of different alarm sources of the same network element type, to obtain the frequent alarm subsequence set of the K network element types.

In a possible implementation, the apparatus further includes a first filtering unit, configured to calculate first confidence of a first association rule and second confidence of a second association rule, where the first association rule and the second association rule are one or more pairs of association rules corresponding to a same alarm, and compare the first confidence and the second confidence, to use an association rule whose confidence is greater as the association rule.

In a possible implementation, the alarm field further includes alarm location information, and the apparatus further includes a second filtering unit, configured to calculate first confidence of a first association rule and second confidence of a second association rule, where the first association rule and the second association rule are a plurality of pairs of association rules corresponding to a same alarm, compare the first confidence and the second confidence, to obtain a plurality of third association rules whose confidence is greater in the first confidence and the second confidence, determine whether an alarm pair corresponding to a fourth association rule in the plurality of third association rules has the same alarm location information, where the fourth association rule is an association rule in which there is an association between each alarm in the corresponding alarm pair and a same alarm, if the alarm pair does not have the same alarm location information, suppress the fourth association rule, and obtain a plurality of third association rules other than the suppressed fourth association rule, to use the plurality of third association rules as the association rule.

According to a third aspect, this application provides a computer storage medium, configured to store computer software instructions used by the alarm analysis apparatus provided in the second aspect. The computer software instructions include a program designed for performing the foregoing aspects.

According to a fourth aspect, an embodiment of the present invention provides a computer program. The computer program includes instructions. When the computer program is executed by a computer, the computer may be enabled to perform a procedure in the alarm analysis method in any one of items in the first aspect.

According to a fifth aspect, this application provides a chip system. The chip system includes a processor, configured to support an alarm analysis apparatus in implementing a function in the first aspect, for example, receiving or processing data and/or information in the foregoing methods. In a possible design, the chip system further includes a memory, and the memory is configured to store program instructions and data that are necessary for the alarm analysis apparatus. The chip system may include a chip, or may include a chip and another discrete component.

According to a sixth aspect, this application provides a server. The server includes a memory, and the memory stores executable program code. The server may further include a processor coupled to the memory, and the processor invokes the executable program code stored in the memory, to perform a corresponding function in the alarm analysis method provided in any one of the first aspect.

According to a seventh aspect, this application provides a device. The device includes a processor, and the processor is configured to support the device in performing a corresponding function in the alarm analysis method provided in the first aspect. The device may further include a memory, the memory is configured to be coupled to the processor, and the memory stores program instructions and data that are necessary for the device. The device may further include a communication interface, configured to perform communication between the device and another device or a communication network.

BRIEF DESCRIPTION OF THE DRAWINGS

To describe the technical solutions in embodiments of the present invention more clearly, the following briefly describes the accompanying drawings required for describing the embodiments.

FIG. 14 shows a data structure of a standard data unit SDU according to an embodiment of the present invention;

DETAILED DESCRIPTION OF ILLUSTRATIVE EMBODIMENTS

Figure 1:
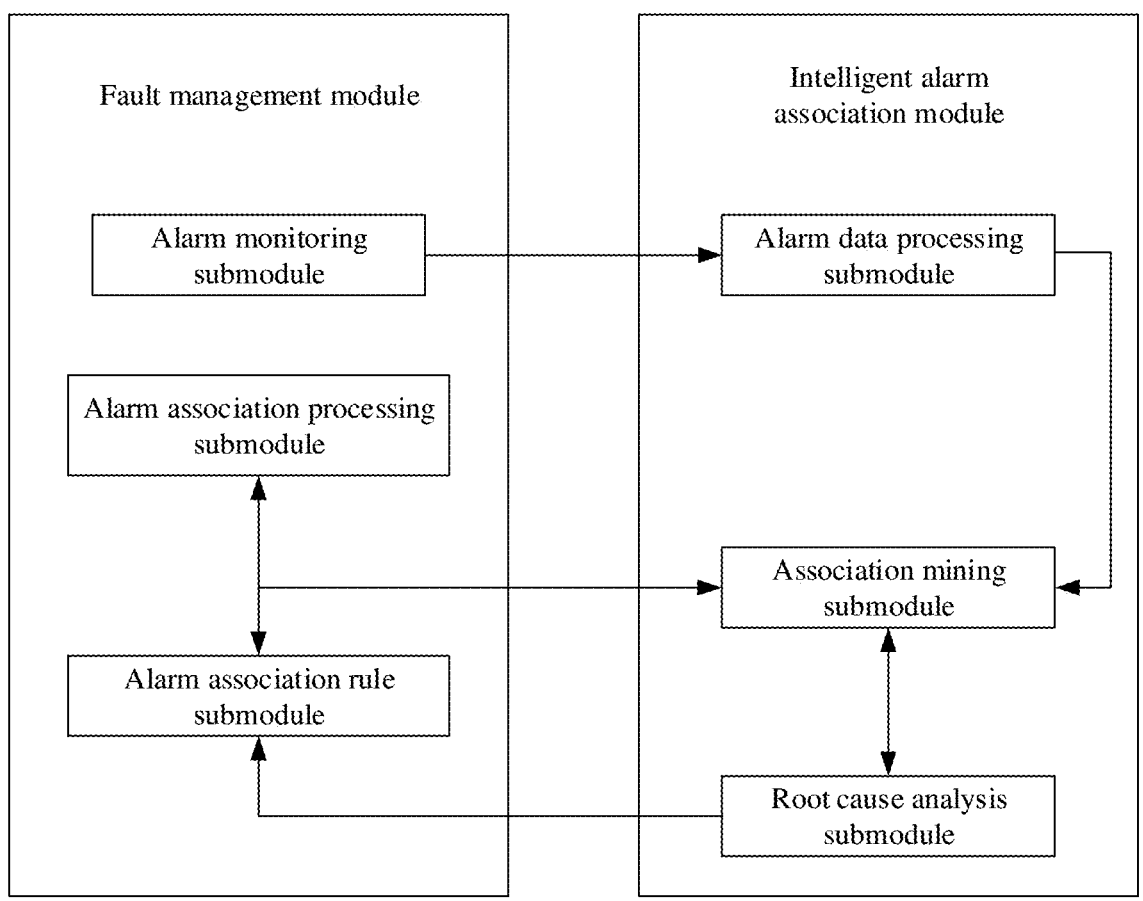
FIG. 1 is a schematic diagram of an application scenario of an alarm analysis method according to an embodiment of the present invention.

The following describes embodiments of the present invention with reference to the accompanying drawings in the embodiments of the present invention.

In the specification, claims, and accompanying drawings of this application, the terms "first", "second", "third", "fourth" and the like are intended to distinguish between different objects but do not indicate a particular order. In addition, the terms "including", "having", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

Some terms in this application are first described, to help a person skilled in the art have a better understanding.

(1) In a network management domain, an alarm refers to prompt information generated by using a device when a specific event occurs, and may be predefined by a manufacturer. Occurrence of the alarm indicates that a fault possibly occurs in a system, but does not necessarily occur in the system. Occurrence of the fault may cause an exception of another network element in a service, resulting in a series of related alarms. Generally, alarm information includes information such as a name of a related faulty device, a fault symptom, an occurrence location, and occurrence time.

(2) A telecommunications management network (Telecommunications Management Network, TMN) is one of supporting systems of a modern telecommunications network. The telecommunications management network is a general name of a software and hardware system and an organization system established to effectively manage the telecommunications network for normal operating and serving of the telecommunications network. The telecommunications management network mainly includes a network management system, a maintenance monitoring system, and the like. A main function of the telecommunications management network is to organize network traffic distribution effectively based on a service flow between offices and traffic statistics data, and perform circuit scheduling, path organizing and detouring, traffic control, and the like through analysis and determining, to avoid network overload and congestion spreading.

(3) A network management system (NMS) is a network management system in a mobile communication network. A managed object of the network management system may include all entities in the network, for example, a network device, an application, a server system, a router, a switch, an HUB, and auxiliary equipment. The network management system provides a system-wide network view for a network system administrator. A solution is used, at three layers, for management of the mobile communication network, and the three layers include an NMS layer, an element management system (EMS) layer, and a network element layer.

(4) A network element (NE) is also referred to as a network unit, includes one or more chassis or subracks, and can independently complete a transmission function. A network element in a network management system may be simply understood as an element or unit in a network, or a device in the network. In conclusion, the network element is a smallest unit that can be monitored and managed in network management. It should be noted that the network element, the network element, and a managed device are synonymous, but the managed device is easily understood as hardware. An element management system (EMS) is a system that manages one or more telecommunications network units of a specific type.

(5) An association rule is an implication in a form of X→Y, where X and Y are respectively referred to as an antecedent (antecedent or left-hand-side, LHS) and a consequent (consequent or right-hand-side, RHS) of the association rule. The association rule XY has a support degree and a trust degree. The association rule is defined as: It is assumed that I={$I_1$, $I_2$, ..., $I_m$} is a set of items. A transaction database D is given, where each transaction (Transaction)t is a non-empty subset of I, that is, each transaction corresponds to a unique identifier TID (Transaction ID). The support degree (support) of the association rule in D is a percentage, namely, a probability, of transactions in D that include both X and Y. The confidence is a percentage, namely, a conditional probability, of transactions in D that include Y when the transactions already include X. If a minimum support degree threshold and a minimum confidence threshold are satisfied, it is considered that the association rule is interesting. The thresholds are manually set based on a mining need. A mining process of the association rule mainly includes two stages: in the first stage, all high-frequency project groups need to be found from a document set, and in the second stage, the association rule is generated in the high-frequency project groups.

(6) A frequent itemset, alternatively referred to as a high-frequency project group, is a set whose support degree is greater than or equal to a minimum support degree (min_sup). The support degree is frequency of occurrence of a set in all transactions. A classic application of the frequent itemset is a market basket model. The frequent itemset can tell variables that usually appear together in a dataset, to provide some support for a possible decision. Frequent itemset mining is a basis of many mining tasks of important data such as an association rule, association analysis, a causality, a sequential itemset, a local periodic property, and a story segment. Therefore, the frequent itemset is widely used. A set of items is referred to as an itemset. An itemset including k items is referred to as a k-itemset. An out-of-item frequency of an itemset is a quantity of transactions including the itemset, and is referred to as a frequency of the itemset, a support degree count, or a count for short. For example, in the embodiments of the present invention, a frequent one-item alarm sequence set includes a plurality of one-item alarm sequences, such as A, E, and C, where A represents a type-A alarm sequence. A frequent two-item alarm sequence set includes a plurality of two-item alarm sequences, such as AE, AC, and EC, where AE represents an alarm sequence including a type-A alarm and a type-E alarm.

(7) A random forest is a classifier that includes a plurality of decision trees in machine learning, and a type output by the random forest is determined based on a mode of types output by an individual tree. Each tree is built based on the following algorithm: T is used to represent a quantity of training cases (samples), and R is used to represent a feature quantity. A feature quantity r is input, to determine a decision result of a node on a decision tree, where r needs to be far less than R. Sampling is performed for T times on the T training cases (samples) in a manner of sampling with replacement, to form a training set (that is, bootstrap sampling), and prediction is performed by using a case (sample) that is not sampled, to evaluate an error of the decision result. r features are randomly selected for each node, where a decision of each node on the decision tree is determined based on the features. An optimal splitting manner of the decision tree is determined based on the r features.

(8) A decision tree, also referred to as a classification tree, is a decision analysis method of evaluating a risk of a project and determining feasibility of the project by constructing, on a basis that occurrence probabilities of various cases are known, the decision tree to obtain a probability that an expected value of a net present value is greater than or equal to zero. The decision tree is a graphical method of intuitively using probability analysis. In machine learning, the decision tree is a prediction model that represents a mapping relationship between an object attribute and an object value. Entropy=a disorder degree of a system. The entropy is used by using an algorithm ID3, an algorithm C4.5, and a spanning tree algorithm C5.0. The decision tree is a tree structure in which each internal node represents a test on an attribute, each branch represents a test output, and each leaf node represents a type. The classification tree (decision tree) is a very common classification method. That is, samples are given, where each sample includes a group of attributes and a type, and the types are predetermined, so that a classifier is obtained through learning, where the classifier can correctly classify a new object.

For ease of understanding the embodiments of the present invention, for example, the following lists a scenario to which an alarm analysis method in this application is applied. The scenario may include the following scenario in which alarm association analysis performance of a fault management module is improved by using an intelligent alarm association module.

FIG. 1 is a schematic diagram of an application scenario of an alarm analysis method according to an embodiment of the present invention. The application scenario includes a fault management module and an intelligent alarm association module. The foregoing modules may both be configured on one or more network nodes (that is, node devices, such as servers with a management function) of a telecommunications management network. In addition, different devices carrying the foregoing modules may communicate with each other by using Wi-Fi, a mobile network, and the like. The foregoing modules on a same device may exchange data between the modules based on a program or code. Specifically, the fault management module may include an alarm monitoring submodule, an alarm association processing submodule, and an alarm association rule submodule. The alarm monitoring submodule stores topology structure information of a managed network and real-time alarm information reported by a network element node in the network, to monitor the managed network in real time. An alarm generated in real time in the network is compared with an alarm association rule in the alarm association rule submodule, to determine a fault cause. The alarm association rule may be a fixed known rule obtained through experience of a fault processing expert. Alarm association analysis is implemented by using the alarm association processing module.

The intelligent alarm association module may include an alarm data processing submodule, an association mining submodule, and a root cause analysis submodule. The alarm data processing submodule may be configured to obtain raw alarm data from the alarm monitoring submodule, and then preprocess the raw alarm data (including an active alarm and a historical alarm). A change of an alarm status is caused because a related event or operation is received. Therefore, the alarm data may be classified into the active alarm and the historical alarm. The active alarm may be an alarm that has not been cleared, and the historical alarm may be an alarm that has been generated. For example, when an alarm trigger message is received, an alarm that is not cleared and not determined is generated. Then a clear message of the alarm is received, and the alarm automatically changes from a status in which the alarm is not cleared and not determined to a status in which the alarm is cleared and not determined (Network management and monitoring personnel do not perform a determining operation on the alarm), and the alarm is transferred from a current active alarm base to a historical alarm base. The association mining submodule is configured to obtain statistics of a target alarm sequence based on the preprocessed alarm data, and then generate an alarm association rule. Further, the generated new alarm association rule may be stored in a rule base of an alarm association rule submodule. The updated rule base may be used for analysis performed by the association mining submodule and subsequent secondary mining performed on the rule again, and a processing result of the alarm association processing submodule may be used to improve the alarm association rule. The root cause analysis submodule is configured to perform in-depth processing on the alarm association rule and the alarm data, perform training by using a random forest algorithm, to obtain an association of a resource instance to which the alarm belongs, and predict a root alarm based on an association module. Particularly, the alarm association is reversely inferred or accuracy of the association rule is reversely checked based on a dependency relationship between predicted systems and a dependency relationship between alarm objects. This can also help supplement the alarm association rule.

It may be understood that the application scenario in FIG. 1 is merely an example implementation in this embodiment of the present invention, and the application scenario in this embodiment of the present invention includes but is not limited to the foregoing application scenario.

Figure 2:
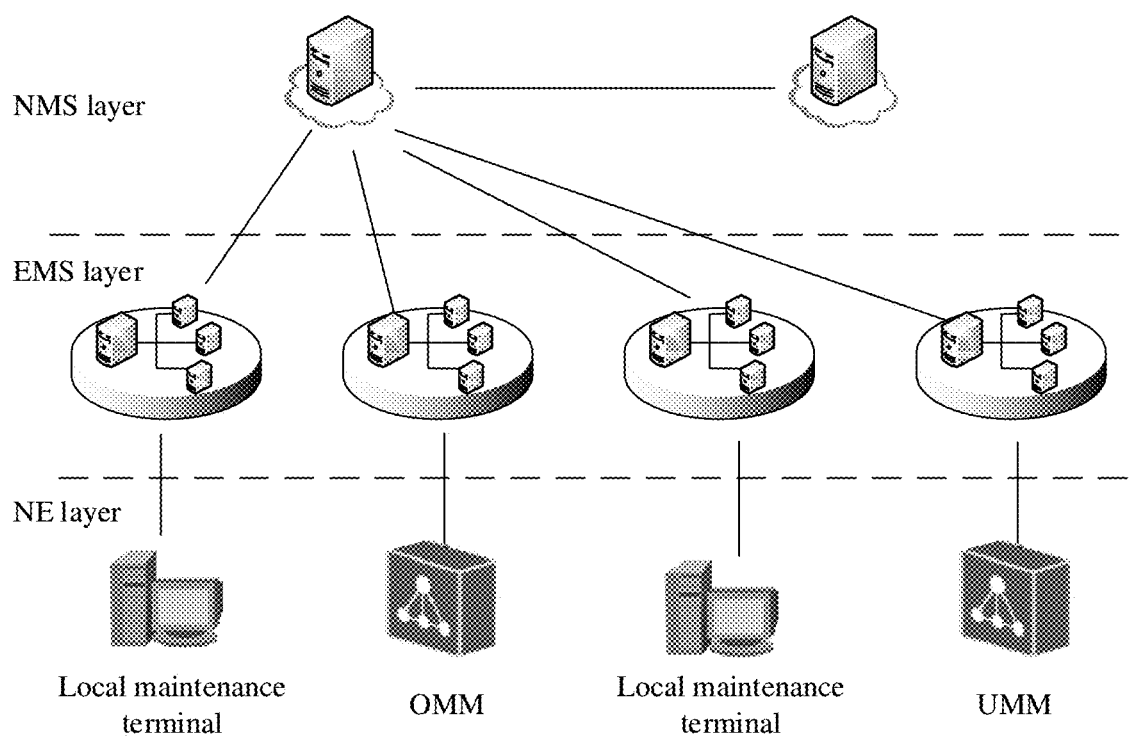
FIG. 2 is a schematic diagram of an alarm analysis architecture according to an embodiment of the present invention.

With reference to the foregoing application scenario, the following first describes a system architecture on which the embodiments of the present invention are based. FIG. 2 is a schematic diagram of an alarm analysis architecture according to an embodiment of the present invention. The alarm analysis method proposed in this application may be applied to the system architecture. The system architecture includes a network management system NMS layer, an element management system (EMS) layer, and a network element NE layer. Generally, the EMS manages a function and capacity of each NE, but does not manage a communication between different NEs in a network. The EMS needs to communicate with a network management system (NMS) at a higher level to support the communication between the NEs, and the NMS is also an element of a telecommunications management network (TMN) model. The EMS is a basis of an operations support system (OSS) architecture that is based on a TMN hierarchical model. The architecture enables a service provider (Service Provider, SP) to satisfy a requirement of a customer on a fast-developing service and satisfy a strict quality of service (QoS) requirement. In the system architecture of a telecommunications management network, a node device (for example, a server or server group that has a management function in the EMS layer) of the network may perform the alarm analysis method. Details are as follows.

The NMS layer manages networks of different regions and different device providers, so that a network administrator can comprehensively monitor the networks through the NMS. As shown in FIG. 2, the NMS layer may include a plurality of servers, and each server is responsible to manage a network including a specific quantity of devices in a specific area.

The EMS layer focuses on network element management in the region, the network, and a subnetwork. The EMS layer is connected to a higher-layer network management system through a northbound interface (NBI). As shown in FIG. 2, the EMS layer may include a plurality of element management systems, and each element management system includes a master server and a plurality of child servers.

The NE layer includes a mobile communication network network element device and an operation & maintenance center (OMC) of the mobile communication network network element device. The OMC is provided by a device provider, is used together with a device, and supports a local management mode. For example, as shown in FIG. 2, the OMC includes a local maintenance terminal, an operation & maintenance module (OMM), and a unified maintenance module (UMM).

Figure 3:
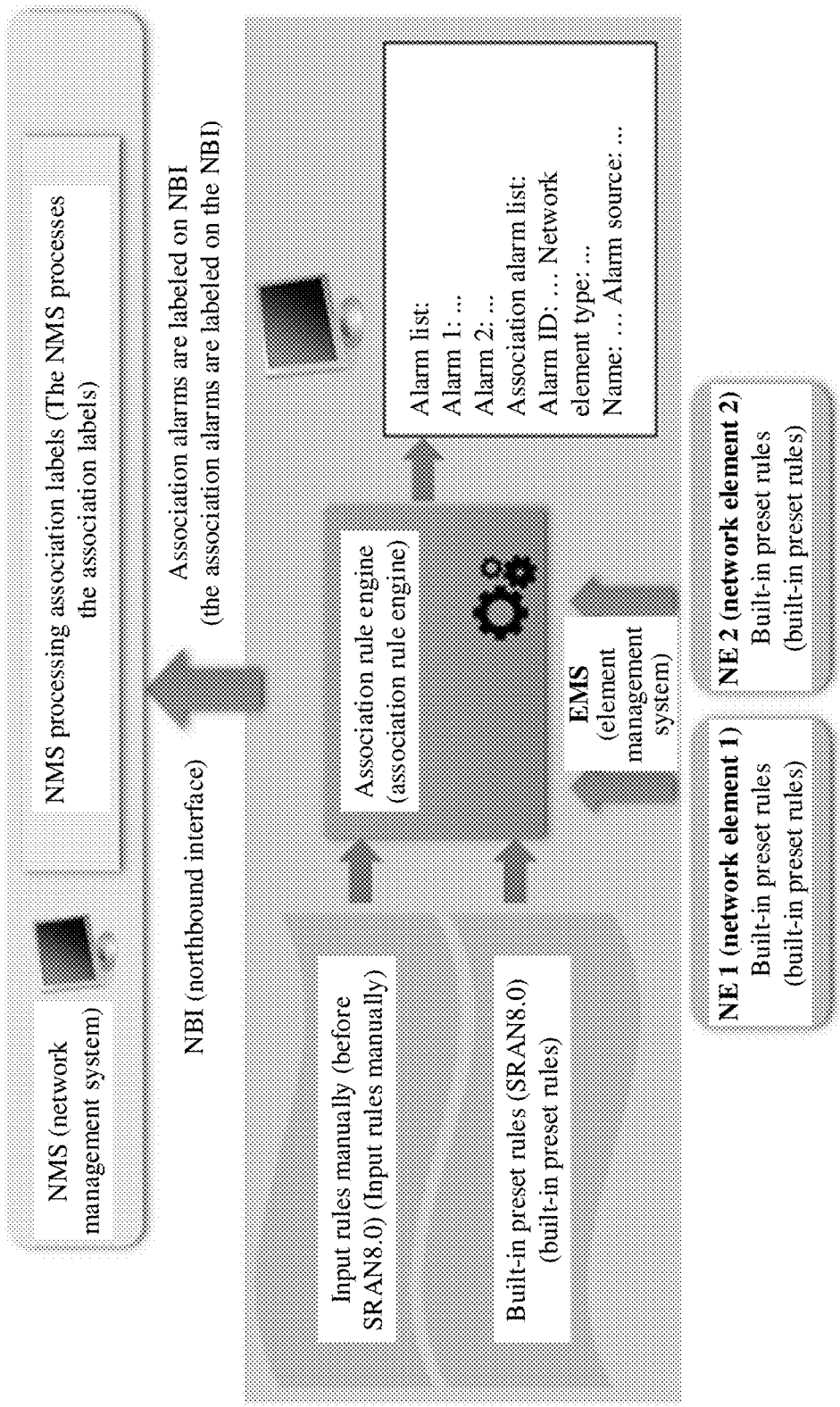
FIG. 3 is a schematic diagram of a working principle of alarm analysis according to an embodiment of the present invention.

Based on the foregoing system architecture of the telecommunications management network, for example, an alarm analysis procedure and a working principle are described. FIG. 3 is a schematic diagram of a working principle of alarm analysis according to an embodiment of the present invention. As shown in FIG. 3, an EMS manages a plurality of NEs. A built-in association rule (namely, built-in default rules) may be input to an association rule engine (namely, an association rule engine) by using a network element, through an SRAN 8.0, or in a manual manner. Then, the association rule engine in the EMS implements alarm association analysis. Then, the EMS is connected to an NMS through an NBI, and labels an association alarm (that is, an alarm with an association) in a transmission process. The NMS processes and analyzes association labels.

Figure 4:
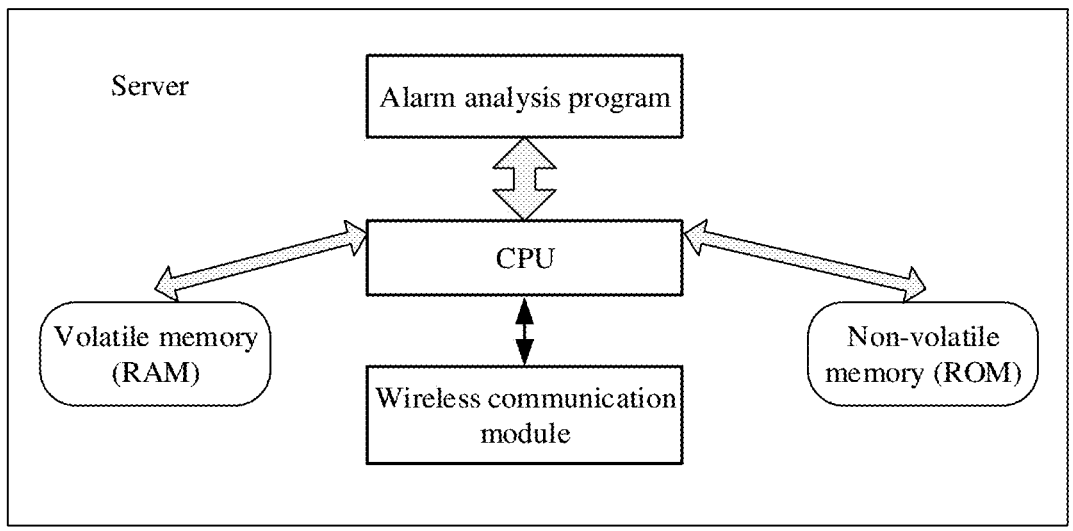
FIG. 4 is a schematic diagram of a structure of a node device according to an embodiment of the present invention.

When a node device is a server, for composition of the service, refer to FIG. 4. FIG. 4 is a schematic diagram of a structure of a node device according to an embodiment of the present invention. The terminal device may include a processor (CPU), a related volatile memory (RAM), a non-volatile memory (ROM), a memory configured to store an alarm analysis program, where the alarm analysis program is used to implement alarm association analysis, and a wireless communication module configured to communicate with another device (including a network element device in a managed network). In this embodiment of this application, a specific actual structure of the node device is not specifically limited in this application.

It may be understood that the system architecture in FIG. 2 is only an example implementation in the embodiments of the present invention, and architectures in the embodiments of the present invention include but are not limited to the foregoing system architecture.

With reference to the foregoing application scenario, the system architecture, and the embodiment of the alarm analysis method provided in this application, the following specifically analyzes and resolves the technical problem proposed in this application.

Figure 5:
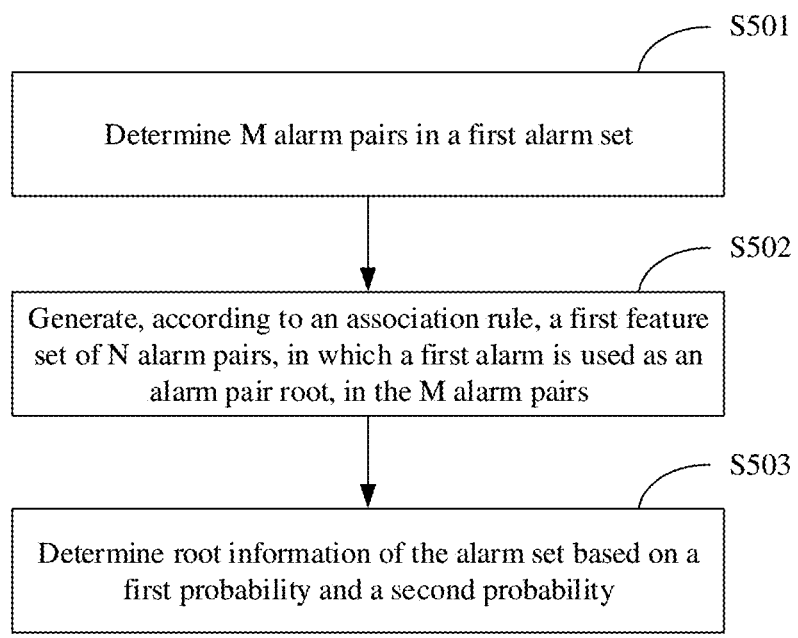
FIG. 5 is a schematic flowchart of an alarm analysis method according to an embodiment of the present invention.

FIG. 5 is a schematic flowchart of an alarm analysis method according to an embodiment of the present invention. The alarm analysis method is applied to an alarm analysis system (including the foregoing system architecture), and is applicable to the application scenario shown in FIG. 1. The alarm analysis system includes a server (for example, a server at an EMS layer and a server at an NMS later) and a terminal (for example, a network element device at an NE layer). Descriptions are provided from a side of the server with reference to FIG. 5 in the following. The method may include the following step S501 to step S503.

Step S501: Determine M alarm pairs in a first alarm set.

Specifically, an association between alarms in the first alarm set is determined based on a preset fixed association rule or accumulated expert knowledge and an association rule that is obtained based on alarm analysis. The first alarm set includes a plurality of alarms. Alarm data in the first alarm set may be a raw alarm, or may be alarm data on which a data processing process such as data cleansing or data filtering is performed. Optionally, the foregoing association rule obtained based on the alarm analysis may be an association rule obtained based on the first alarm set, or may be an association rule obtained based on a historical alarm set (that is, an alarm set that has been analyzed before the first alarm set is processed). Each of the M alarm pairs includes a first alarm and a second alarm between which an association exists, and M is an integer greater than 0. The association may be a relationship that a change of an alarm affects or generates another alarm. A method for determining the alarm pairs in the first alarm set is not limited in this embodiment of the present invention. The alarm pair may be classified into a root alarm (which is also referred to as a root alarm) and a correlative alarm based on a generation relationship between the alarms. For example, a server obtains, according to an association rule A→B, that an alarm A and an alarm B are an alarm pair, and the alarm A is a root alarm (that is, an alarm pair root) in the alarm pair and the alarm B is a correlative alarm of the alarm A. Optionally, before the M alarm pairs are determined by using the association rule, the association rule is obtained based on a target alarm set (which may include a raw alarm set corresponding to the first alarm set and another raw alarm set).

Step S502: Generate, according to the association rule, a first feature set of N alarm pairs, in which the first alarm is used as an alarm pair root, in the M alarm pairs.

Specifically, the alarm pair root in each alarm pair is determined according to the association rule. Due to application of a subsequent classification algorithm, only the first feature set may be obtained as an algorithm. The first feature set includes alarm feature data of the N alarm pairs, and the alarm pair root of each alarm pair is the $1^{st}$ alarm (that is, the first alarm). The first feature set includes a first probability that a first subsystem to which each first alarm in the N alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, where N is an integer greater than 0 and less than M. For example, (A, B) is one of the M alarm pairs, and it may be set that an alarm A is the first alarm and an alarm B is the second alarm. If it is determined, according to the association rule (which is also referred to as an alarm association rule), that the alarm A is the alarm pair root, (A, B) is one of the N alarm pairs.

In a possible implementation, the generating, according to an association rule, a first feature set of N alarm pairs, in which the first alarm is used as an alarm pair root, in the M alarm pairs includes determining an alarm pair root of each of the M alarm pairs according to the association rule, counting a quantity of times for which the first subsystem is the subsystem root and the first alarm object is the alarm object root, to calculate the first probability, and counting a quantity of times for which the second subsystem is the subsystem root and the second alarm object is the alarm object root, to calculate the second probability, and obtaining the first feature set of the N alarm pairs in which the first alarm is used as the alarm pair root. In this embodiment of the present invention, the alarm pair root of each alarm pair is determined by using the association rule, and the first probability and the second probability of each alarm pair are calculated, to obtain the alarm feature data corresponding to each alarm pair. Then one or more alarm pairs in which the first alarm is used as the alarm pair root are filtered from the M alarm pairs, to generate the first feature set. The association rule is fully used, and the key feature of the alarm pair is mined. The probability is counted, so that the association (or a dependency relationship) between the subsystems included in the alarm and the association between the alarm objects can be effectively analyzed. The obtained first feature set helps subsequently perform processing based on the classification algorithm. A calculation sequence of calculating the first probability and calculating the second probability and a sequence of determining the alarm pair root and calculating the foregoing probabilities are not limited in this embodiment of the present invention.

For how to generate the first feature set according to the association rule in step S502, for example, the following two examples are listed.

Figure 6:
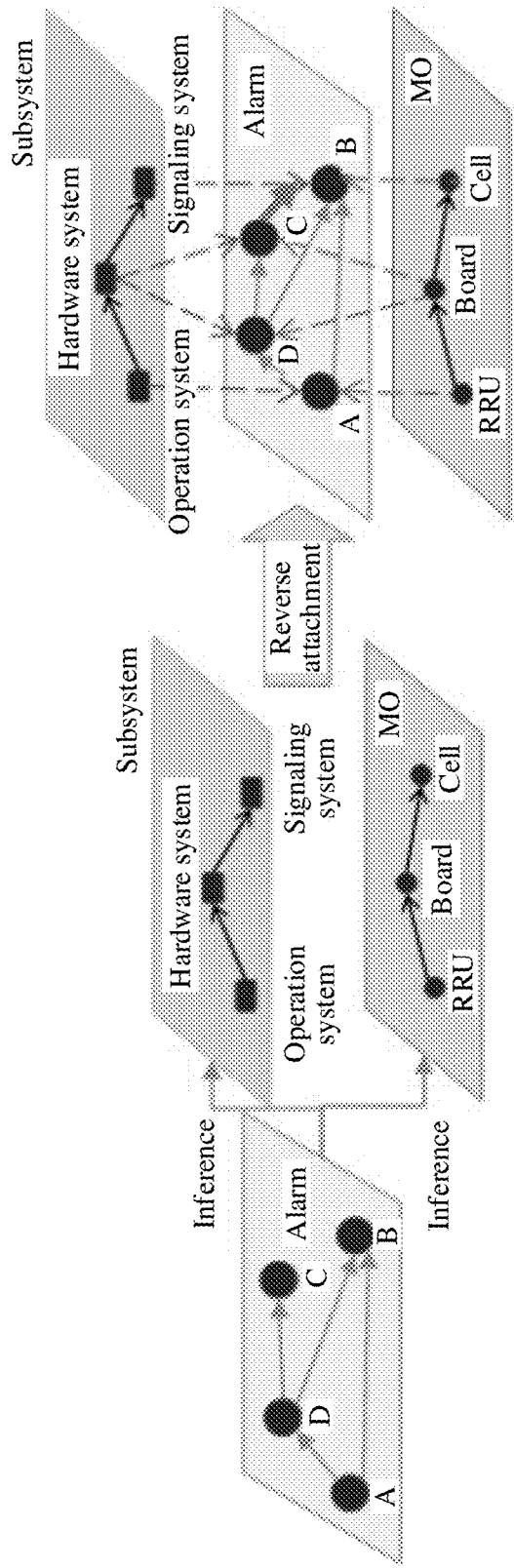
FIG. 6 is a schematic diagram of a root cause analysis processing procedure according to an embodiment of the present invention.

Example one: FIG. 6 is a schematic diagram of a root cause analysis processing procedure according to an embodiment of the present invention. Inference (that is, alarm dependency inference) is performed on an alarm A, an alarm B, an alarm C, and an alarm D, to obtain a subsystem type and a managed object (MO object, that is, an alarm object, which is described as an alarm object type in FIG. 6) that correspond to each alarm. A result of an alarm association determined according to an association rule is corrected by using reverse attachment (that is, reverse alarm dependency inference) based on a dependency relationship among the subsystem types and a dependency relationship among the MO objects, to obtain a final accurate result of the alarm association. In a process of the reverse alarm dependency inference, prior input data of the alarm association defined according to the association rule may further be corrected by using result data obtained through the reverse alarm dependency inference, to form a feedback loop, so that an algorithm final result is used for modification, to obtain a correct alarm association determining result. The MO objects and the alarm subsystem types in FIG. 6 are all example descriptions. An alarm dependency inference process may include the following steps.

For a known alarm association rule and an input alarm sequence (such as an alarm A and an alarm B), it is denoted that an OSSa and an OSSb respectively represent a subsystem to which the alarm A belongs and a subsystem to which the alarm B belongs, and an MOa and an MOb respectively represent an MO object (that is, an alarm object) of the alarm A and an MO object of the alarm B.

(1) If in a (A, B) alarm pair, it is determined, according to the known rule, that the alarm A is a root (that is, an alarm pair root), a count of (OSSa, OSSb) is (1, 0), and a count of (MOa, MOb) is (1, 0). If the alarm B is a root, the count of (OSSa, OSSb) is (0, 1), and the count of (MOa, MOb) is (0, 1). After all alarm pairs are counted, a counting condition of (OSSa, OSSb) and a counting condition of (MOa, MOb) may be obtained.

(2) The first probability may further be obtained through calculation based on the foregoing counting conditions:

a probability that the OSSa is a root:

$$P_{OSSa} = \frac{\text{The quantity of times for which the } OSSa \text{ is a root}}{\text{A quantity of times for which the } OSSa \text{ is a root} + \text{A quantity of times for which the } OSSb \text{ is a root}};$$

and
a probability that the MOa is a root:

$$P_{MOa} = \frac{\text{The quantity of times for which the } MOa \text{ is a root}}{\text{A quantity of times for which the } MOa \text{ is a root} + \text{A quantity of times for which the } MOb \text{ is a root}}$$

By analogy, the second probability, that is, a probability that the OSSb is a root and a probability that the MOb is a root, may be obtained.

(3) The following data may be obtained based on the foregoing obtained probabilities and the determining result of the alarm pair.

(A, B, Poss_a, Poss_b, $P_{MO}\_a$, $P_{MO}\_b$, 'X'/'Y'), where "X" indicates that the 1$^{st}$ alarm in the alarm pair is the root alarm, and "Y" indicates that the 2$^{nd}$ alarm in the alarm pair in the root alarm.

Figures 7, 8:
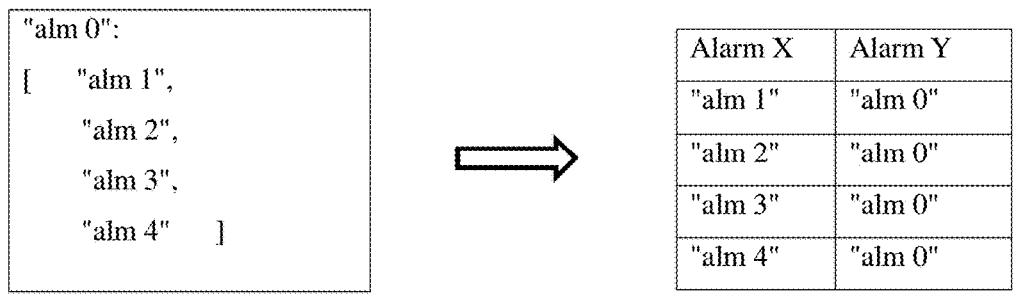
FIG. 7 is a schematic diagram of association rule processing according to an embodiment of the present invention.
FIG. 8 is a schematic diagram in which an association rule is associated with an alarm according to an embodiment of the present invention.

Example two: The foregoing known alarm association rule may include a formatted white box rule. FIG. 7 is a schematic diagram of association rule processing according to an embodiment of the present invention. A raw format of the white box rule is shown in FIG. 7. An "alm 0" is a correlative alarm, and is represented by using an alarm Y. ["alm 1", "alm 2", "alm 3", "alm 4"] is a root list of the "alm 0". Each alarm in the root list is a root alarm of the "alm 0", and may all be represented by using an alarm X. The raw format of the white box rule, that is, alm 0 ["alm 1", "alm 2", "alm 3", "alm 4"], is converted into a data format shown in a table in FIG. 7.

An attribute (for example, a subsystem to which an alarm belongs and an alarm object) of the alarm is obtained from alarm data, and is associated with the formatted white box rule. FIG. 8 is a schematic diagram in which an association rule is associated with an alarm according to an embodiment of the present invention. For example, an OSS_1 represents a subsystem to which an "alm 1" in an alarm X belongs, and an OBJ_1 (which is described in a description manner similar to that of an MO_1) represents an alarm object corresponding to the "alm 1" in the alarm X. By analogy, representation meanings of an OSS_0 and an OBJ_0 may be obtained. For example, ("alm 1", "alm 0", OSS_1, OSS_0, OBJ_1, OBJ_0) is an association result of an association rule and an alarm pair, the "alm 1" is an alarm X, the "alm 0" is an alarm Y, the OSS_1 is a subsystem to which the alarm X belongs, the OSS_0 is a subsystem to which the alarm Y belongs, the OBJ_1 is an MO object of the alarm X, and the OBJ_0 is an MO object of the alarm Y.

The following is obtained through counting based on the "subsystems to which the alarm X belongs" and the "subsystems to which the alarm Y belongs":

(OSS_1, OSS_0, a probability that the OSS_1 is a root, a probability that the OSS_0 is a root);

(OSS_2, OSS_0, a probability that the OSS_2 is a root, a probability that the OSS_0 is a root);

(OSS_3, OSS_0, a probability that the OSS_3 is a root, a probability that the OSS_0 is a root); and (OSS_4, OSS_0, a probability that the OSS_4 is a root, a probability that the OSS_0 is a root).

Figure 9:
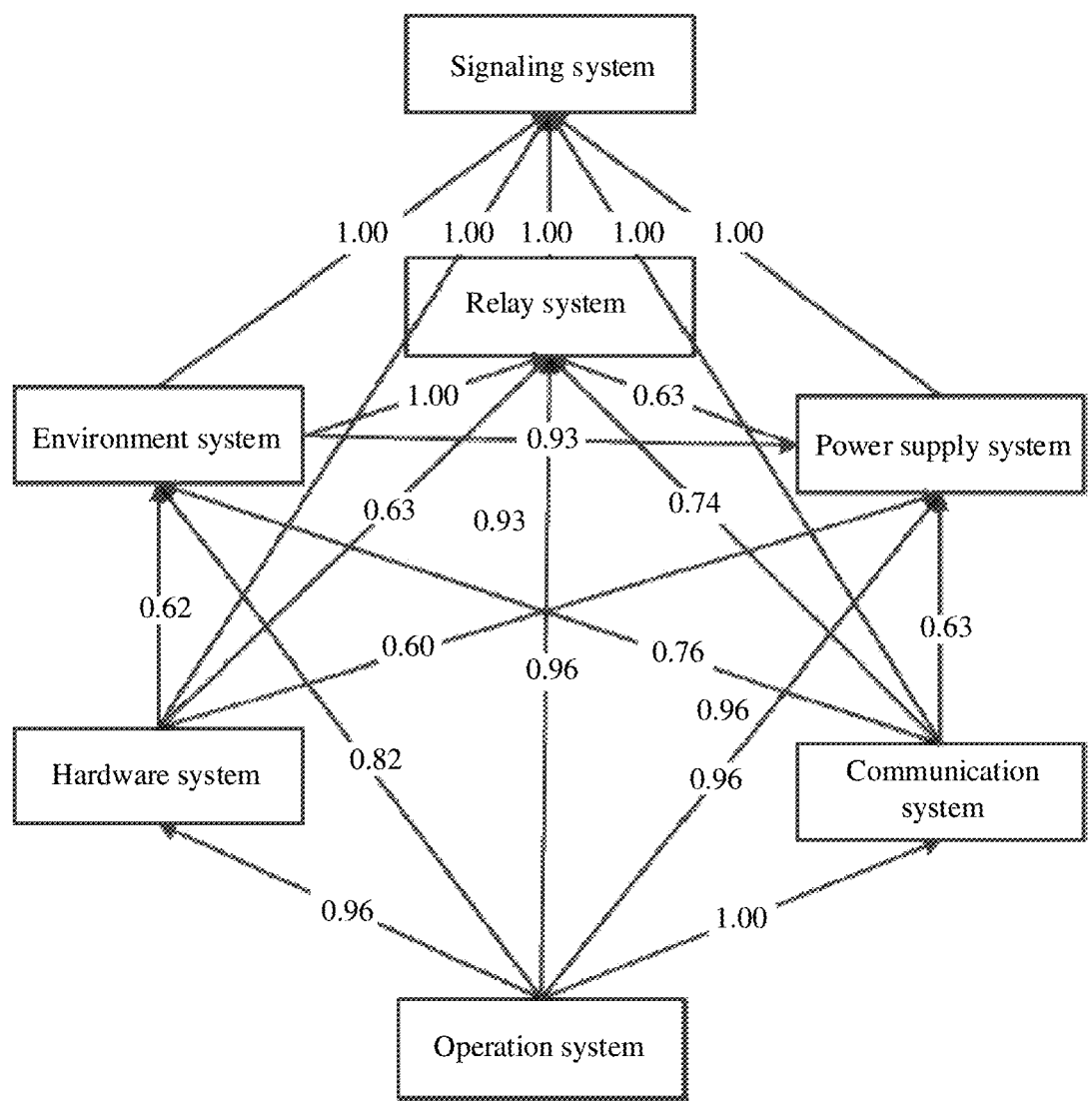
FIG. 9 shows dependency relationships that are based on data analysis and that are among subsystems according to an embodiment of the present invention.

Optionally, a diagram of dependency relationships among subsystems to which alarms belong is obtained based on the foregoing probability statistics. FIG. 9 shows dependency relationships that are based on data analysis and that are among subsystems according to an embodiment of the present invention. As shown in the figure, associations (namely, dependency relationships) among all subsystems corresponding to all valid alarms that are analyzed are described. An edge in the figure represents that there is an association between two connected subsystems, and a number near the edge represents an association degree (which is also referred to as an association probability). Probabilities, subsystem types, and the dependency relationships among the subsystems shown in FIG. 9 are all example descriptions.

Figures 10, 11:
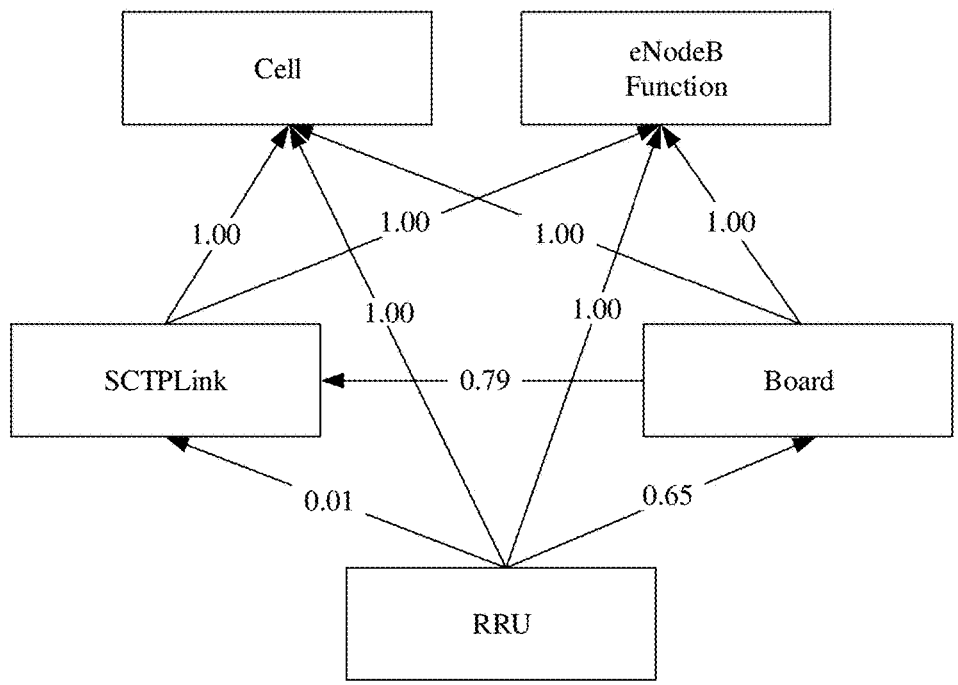
FIG. 10 shows dependency relationships that are based on data analysis and that are among alarm objects according to an embodiment of the present invention.
FIG. 11 shows an alarm feature data structure according to an embodiment of the present invention.

By analogy, optionally, a diagram of dependency relationships among alarm objects corresponding to an alarm may be obtained. FIG. 10 shows dependency relationships that are based on data analysis and that are among alarm objects according to an embodiment of the present invention. As shown in the figure, associations (namely, dependency relationships) among all alarm object types corresponding to all valid alarms that are analyzed are described. An edge in the figure represents that there is an association between two connected alarm object types, and a number near the edge represents an association degree (which is also referred to as an association probability). For example, the alarm object in FIG. 10 is an alarm object type. In addition, probabilities, the alarm object types, and the dependency relationships among the alarm object types shown in FIG. 10 are all example descriptions.

The dependency relationship between the subsystems to which the alarms belong and dependency relationship data of the alarm object are used as an attribute of alarm data, to obtain an alarm feature data structure. In the alarm feature data structure, a feature data instance whose root alarm is the alarm X or whose root alarm is the alarm Y is selected as training data (that is, the first feature set). FIG. 11 shows an alarm feature data structure according to an embodiment of the present invention. For example, ("alm 1", "alm 0", OSS_1, OSS_0, OBJ_1, OBJ_0, Po, Po') in the figure is an example alarm feature data structure. For specific meanings of the pails thereof, refer to the descriptions in FIG. 8. Details are not described herein again. ("alm 1", "alm 0", OSS_1, OSS_0, OBJ_1, OBJ_0, Po, Po') corresponds to the foregoing (A, B, Poss_a, Poss_b, PMO_a, PMO_b, 'X'). Po and Po' correspond to 'X', and are specific descriptions of the information 'X'. Po is a probability that a subsystem to which an alarm X belongs is a root, and Po' is a probability that an object type to which the alarm X belongs is a root.

Step S503: Determine root information of the first alarm set based on the first probability and the second probability.

Specifically, the first probability and the second probability are used as a data set of a classification algorithm, and the root information in the target alarm set is obtained by processing the data set. The root information includes one or more of a root alarm, a root subsystem, and a root alarm object in the first alarm set. A prediction model obtained based on the data set may also be used to infer alarm root information of a new data set.

In a possible implementation, the root information includes the root alarm, the root subsystem, and the root alarm object in the first alarm set, and the determining root information of the first alarm set based on the first probability and the second probability includes calculating the first probability and the second probability and performing classification on the first alarm set by using the first feature set as a training data set of a random forest algorithm, to obtain the root alarm, the root subsystem, and the root alarm object. For example, in the alarm feature data structure, a feature data instance whose root alarm is the alarm X or whose root alarm is the alarm Y is selected as the training data, and the random forest algorithm (an algorithm in a classification algorithm of a machine learning algorithm) is used to train a decision rule. A training process may include the following four steps: 1. Generate s samples from S samples in a resampling manner, where s≤S, 2. Randomly select j features from J features, where j≤J, 3. Establish a decision tree based on a data set including the j features and the s samples, and 4. Repeat steps 1 to 3 for c times, to generate c decision trees. That the root alarm is automatically determined based on the decision rule generated based on the random forest algorithm may include the following steps: 1. Extract a feature based on newly generated alarm data, and 2. Predict, based on a training model, a root cause and a correlative relationship of a newly generated alarm pair. In this embodiment of the present invention, the random forest algorithm is used to classify the data obtained by performing mining again based on the rule, to use the data as the training set to determine the root alarm. This reduces a manual analysis process, improves efficiency of root inference, and helps facilitate locating and investigating a fault in the telecommunications network.

In a possible implementation, the method further includes determining a third subsystem to which a third alarm belongs and a third alarm object corresponding to the third alarm, and a fourth subsystem to which a fourth alarm belongs and a fourth alarm object corresponding to the fourth alarm, where the third alarm and the fourth alarm are any two alarms in a second alarm set, generating a second feature set of the M alarm pairs according to the association rule, where the second feature set includes a first probability that a first subsystem to which each first alarm in the M alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, determining, based on the second feature set, a first association between the third subsystem and the fourth subsystem and a second association between the third alarm object and the fourth alarm object, and determining, based on the first association and the second association, whether there is an association between the third alarm and the fourth alarm. The foregoing possible implementation is a reverse alarm dependency inference process, and an association of an unknown association alarm pair is inferred based on information about an association between MOs to which alarms belong and an association between subsystems to which the alarms belong. Specifically, for example, for a to-be-determined alarm pair (C, D), that is, an association between an alarm C and an alarm D is unknown, a subsystem to which the alarm C belongs and a subsystem to which the alarm D belongs are respectively an OSSc and an OSSd, and MO objects corresponding to the alarm C and the alarm D are respectively an MOc and an MOd. Based on the dependency relationships shown in FIG. 9 and FIG. 10, a dependency relationship (namely, the association between the alarm C and the alarm D) of the alarm pair (C, D) may be reversely obtained. In this embodiment of the present invention, the dependency relationship between the determined subsystems and the dependency relationship between the alarm objects are used to determine the association between the to-be-predicted alarms, so that a method of analyzing the association between the alarms is added, and efficiency of alarm analysis and root inference is improved.

In this embodiment of the present invention, on a basis that an association between alarms is clear, a probability that an alarm in an alarm pair is a root alarm is mined based on information such as a subsystem included in the alarm and an object that generates the alarm, and the root alarm is further predicted based on alarm feature data such as an association between resource instances to which the alarms belong. That is, association analysis and root cause inference are performed from a plurality of dimensions such as a service association logic and historical alarm data, thereby improving efficiency and accuracy of alarm analysis and the root cause. Different from a conventional technology in which the alarm is analyzed by directly using an obtained association rule, in this embodiment of the present invention, after the alarm is analyzed based on the obtained association rule, the alarm association rule is further used to extract a key feature of the alarm set, so that alarm analysis efficiency can be improved, and system-level and device-level association analysis can further be implemented, thereby satisfying an actual requirement of telecommunication operation.

Figure 12:
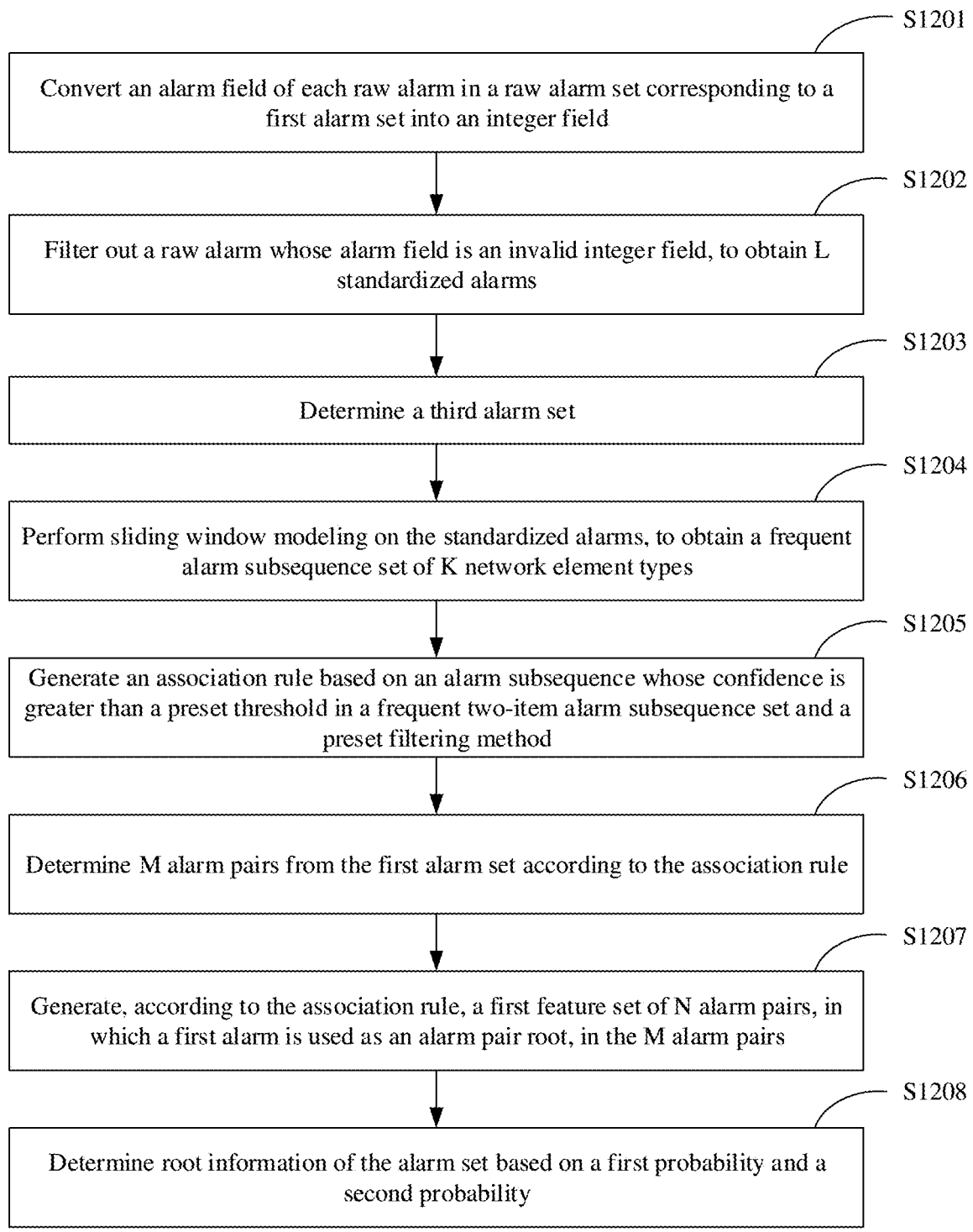
FIG. 12 is another schematic flowchart of an alarm analysis method according to an embodiment of the present invention.

FIG. 12 is another schematic flowchart of an alarm analysis method according to an embodiment of the present invention. The alarm analysis method is applied to the foregoing system architecture, and is applicable to the application scenario shown in FIG. 1. The alarm analysis system includes a server (for example, a server at an EMS layer and a server at an NMS later) and a terminal (for example, a network element device at an NE layer). Descriptions are provided from a side of the server with reference to FIG. 12 in the following. The method may include the following step S1201 to step S1208.

Step S1201: Convert an alarm field of each raw alarm in a raw alarm set corresponding to a first alarm set into an integer field.

Specifically, the alarm field includes one or more of an alarm object, an alarm source, alarm raised time, and alarm clear time. For example, in this embodiment of the present invention, the alarm object, the alarm source, the alarm raised time, and the alarm clear time are mapped to integer fields in a preset manner. FIG. 14 shows a data structure of a standard data unit (SDU) according to an embodiment of the present invention. As shown in the figure, an alarm subsystem may include a communication system, a hardware system, an operation system, and the like. An alarm object (type) may include a Cell, an SCTLink, a remote radio unit (RRU), a Board, and the like. The $1^{st}$ alarm record (that is, a standardized alarm) in the figure is used as an example for description. The alarm record {BTS3900 LTE, Baowuzhong HL1H, 29204, Aug. 27, 2015 12:12:47, Aug. 27/2015 13:13:56, eNodeB name=Wudian HL1H, X2 interface identifier=4294967295, operator index=65535, description information=NULL, specific problem=there is a fault in a bottom-layer link, communication system, Board} is preprocessed and converted into a standard data unit {BTS3900 LTE, 1, 1, 99744, 103413, eNodeB Name=Wudian HL1H, X2 interface ID=4294967295, operator index=65535, description information=NULL, and specific problem=there is a fault in a bottom-layer link, communication system, Board}. Types of content specifically included in the standard data units such as "29204" and "BTS3900LTE" are not limited in this embodiment of the present invention. The descriptions in the figure and the corresponding descriptions are all example descriptions. The "Baowuzhong HL1H" is mapped as 1 (an alarm source, namely, an Alarm Source), and indicates a name of a network element that reports the alarm data. An alarm object (the alarm object herein is a specific fault location) "X2 interface fault alarm" in location information is mapped as 1 (an alarm ID, namely, an alarm ID). Alarm raised time (namely, Occurrence Time) "Aug. 27, 2015 12:12:47" is converted into 99744. Alarm clear time (that is, Clear Time) "Aug. 27, 2015 13:13:56" is converted into 103413. The location information (namely, the Location Info) includes eNodeB Name=Wudian HL1H, where "Wudian HL1H" indicates a name of a specific eNodeB instance that generates the alarm and that is in the network element that reports the alarm data, X2 interface identifier=4294967295, operator index=65535, description information=NULL, and specific problem=there is a fault in a bottom-layer link. A type (namely, an Alarm Type) of a subsystem to which the alarm belongs is a communication system. A type (that is, an ObjType) of the alarm object is a Board.

Step S1202: Filter out a raw alarm whose alarm field is an invalid integer field, to obtain L standardized alarms.

Specifically, an invalid alarm (whose field is an invalid value) record is filtered out, and a standard data unit (SDU) data structure, that is, a standardized alarm, is generated by using the extracted converted alarm and the included valid field. L is an integer greater than 0.

Step S1203: Determine a third alarm set.

Figure 13:
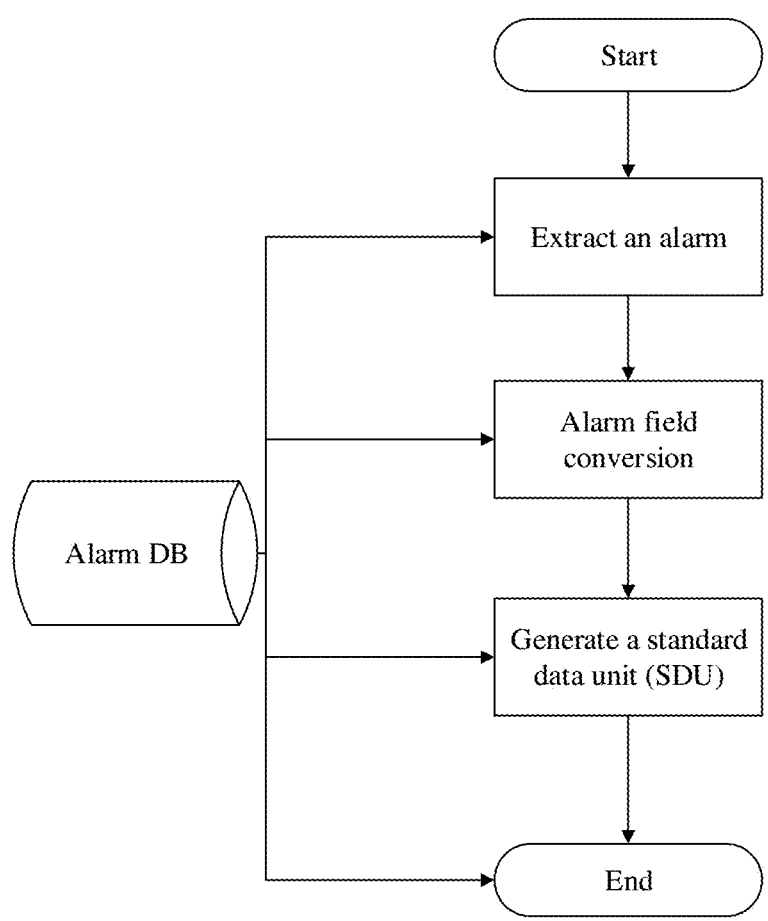
FIG. 13 is a schematic flowchart of alarm preprocessing according to an embodiment of the present invention.

Specifically, the third alarm set includes the L standardized alarms. The third alarm set in step S1203 and the first alarm set in step S1201 may correspond to a same raw alarm set. Optionally, a raw alarm set corresponding to the third alarm set may alternatively be different from a raw alarm set corresponding to the first alarm set in step S1201. In step S1201 to step S1203 in this embodiment of the present invention, the invalid alarm is filtered out by preprocessing the raw alarms. FIG. 13 is a schematic flowchart of alarm preprocessing according to an embodiment of the present invention. In the figure, an alarm database (that is, an alarm DB) stores one or more raw alarm sets, converts an alarm field, and then generates a standardized alarm. By preprocessing data, a quantity of the alarms in the raw alarm set is preliminarily reduced, a data processing amount is reduced, and the alarm analysis efficiency is improved.

Step S1204: Perform sliding window modeling on the L standardized alarms, to obtain a frequent alarm subsequence set of K network element types.

Specifically, types (for example, there are K network element types in total) and a quantity of the types of network element types corresponding to the L standardized alarms in the third alarm set and each alarm source of each network element type are determined based on network element types included in the alarm. The standardized alarm includes the network element type. K is an integer greater than 0, and the frequent alarm subsequence set includes a frequent one-item alarm subsequence set and a frequent two-item alarm subsequence set. In this embodiment of the present invention, the frequent alarm subsequence set is obtained by performing sliding window modeling, so that a series of alarms in same duration are processed in a centralized manner.

Figure 15:
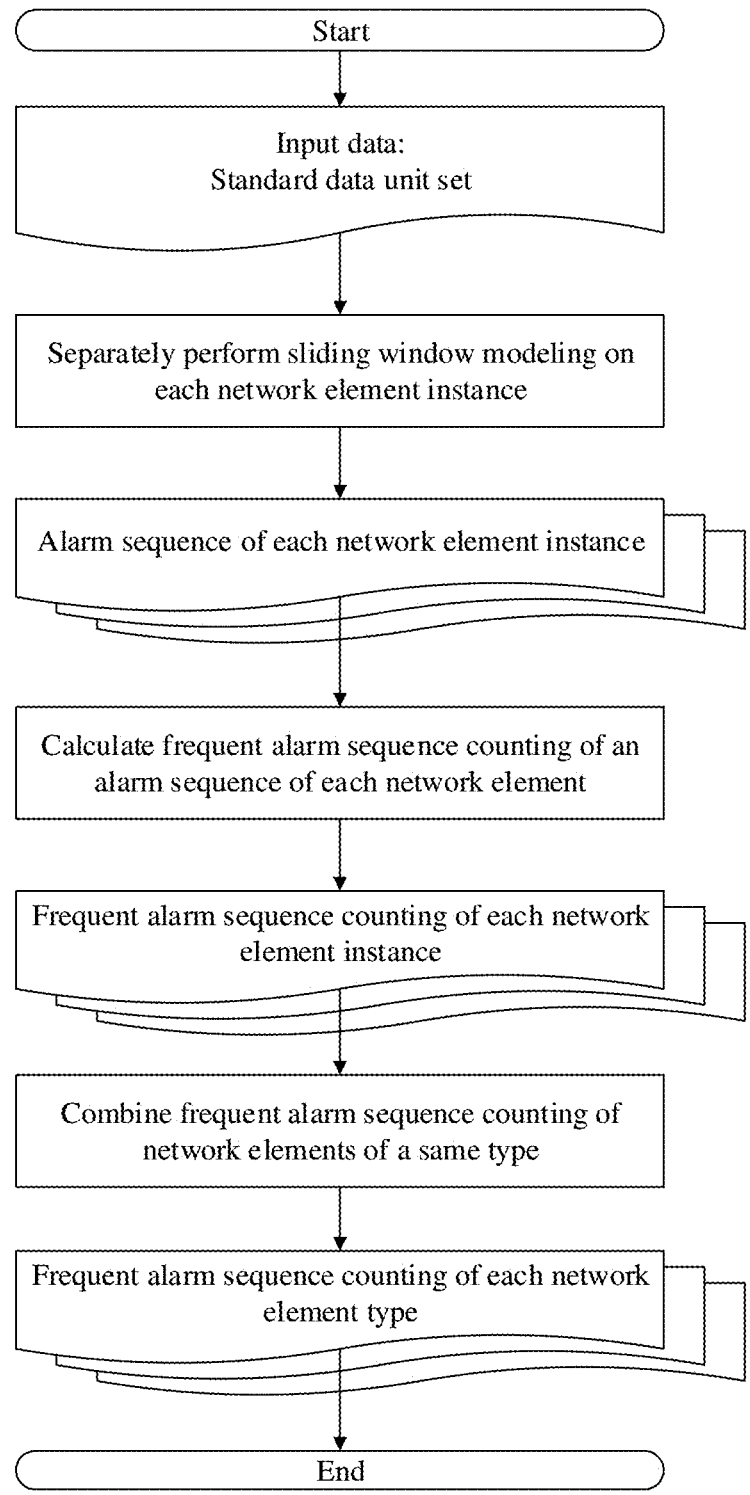
FIG. 15 is a schematic flowchart of counting and processing alarm sequences according to an embodiment of the present invention.

In a possible implementation, the standardized alarm further includes the alarm source and the alarm raised time, and the performing sliding window modeling on the L standardized alarms, to obtain a frequent alarm subsequence set of K network element types includes obtaining, based on network element types and alarm sources of the L standardized alarms, fifth alarms sent by same alarm sources of a same network element type, sorting the fifth alarms in ascending order based on alarm raised time of each of the fifth alarms, obtaining P alarm sequences based on a preset sliding window width and a sliding step by using a constructed sliding window, where the alarm sequence includes one or more fifth alarms in the same sliding window, and P is an integer greater than 0, counting a quantity of times for which an alarm subsequence included in the P alarm sequences occurs, to obtain a frequent alarm subsequence set of the same alarm sources, and separately accumulating frequent alarm subsequence sets of different alarm sources of the same network element type, to obtain the frequent alarm subsequence set of the K network element types. FIG. 15 is a schematic flowchart of counting and processing alarm sequences according to an embodiment of the present invention. As shown in the figure, sliding window modeling is separately performed on input alarm data (that is, a standardized alarm set in the figure) based on each network element instance, an alarm sequence of each network element instance is counted, frequent alarm subsequences are counted for the alarm sequence of each network element instance, frequent alarm subsequences of each network element instance are counted, and counts of frequent alarm sequences of network elements of a same type are combined, to count frequent alarm sequences of each network element type. In this embodiment of the present invention, a sequence of the steps of counting the alarm sequences, counting the types of the network elements, and determining the network element type corresponding to the alarm source (which is alternatively referred to as the network element instance) is not limited.

Therefore, a specific manner of counting the frequent alarm sequences may alternatively include the following steps: 1. For the input standard data unit set, filter alarm data based on the alarm source, and filter all alarms generated by a same alarm source of a same network element type based on the network element instance and based on the network element type and the alarm source. 2. Convert the alarms obtained in step 1 into an alarm sequence, sort the filtered alarm data in ascending order based on raised time, then construct a time window based on a sliding window width and a sliding step parameter input by a user, to intercept the sorted data, and use all alarms in the same time window as an alarm sequence. If an alarm whose name appears for a plurality of times in the same time window, the alarm is processed as a duplicate alarm. Only the alarm that occurs for the first time is remained, and the subsequent alarms are filtered out. An interval between adjacent alarms and a sliding step are simultaneously considered in the sliding window. Using time when the alarm is generated as a standard, a sliding window is slid to the $1^{st}$ alerting event that exceeds a step (the step=the time window length/the sliding step). The sliding window is pushed in sequence in this manner, and the alarm record is gradually converted into the alarm sequence as the time window is continuously slid. 3. Count alarm subsequences in all alarm sequences generated after the sliding window is slid, to calculate an occurrence frequency of each alarm subsequence. A frequent one-item alarm subsequence set and a frequent two-item alarm subsequence set are generated in a candidate set-frequent set architecture manner based on a WINEPI algorithm. 4. Accumulate counts of alarm subsequences of different alarm sources of a same network element type as a final alarm subsequence counting result. Quantities of the alarm sequence sets are summed, counts of the same frequent alarm subsequences (elements in the sequence are in no sequence) is summed, and a union set of the frequent alarm subsequence sets is obtained.

For how to perform sliding window modeling on the standardized alarm in step S1204, the following two examples are listed.

Figure 16:
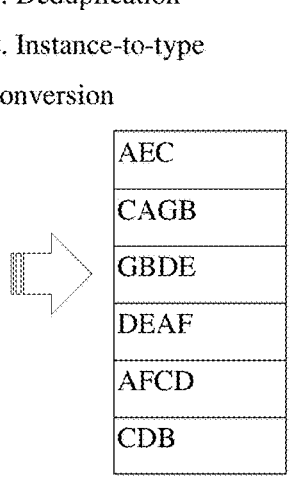
FIG. 16 is a schematic flowchart of sliding window modeling of a network element instance 1 according to an embodiment of the present invention.

Example one: FIG. 16 is a schematic flowchart of sliding window modeling of a network element instance 1 according to an embodiment of the present invention. As shown in the figure, an instance is converted into a sequence type through alarm sequence deduplication according to the method shown in FIG. 15 or in the foregoing specific frequent alarm sequence counting manner.

An example in which a frequent alarm sequence count is calculated by using a network element instance of a BTS3900 LTE network element type is used. Ai to Gi represent alarm instances, and A to G represent alarm types. For example, Ai, Aj, and the like are instances of an alarm type A, and the rest can be deduced by analogy. It is assumed that an interval between alarm raised time is 1s, an algorithm time window is 4s, and a sliding window step is 2s.

Step 1: Perform sliding window modeling on alarm data of a network element instance 1, to form alarm sequence sets S1 to S6.

Step 2: Perform alarm deduplication and instance-to-type conversion on S1 to S6, to obtain an alarm sequence set.

Step 3: Calculate the frequent alarm sequence count based on the alarm sequence set, to obtain a frequent alarm sequence counting set.

The frequent alarm sequence counting set (where a quantity of alarm subsequences S1 to S6 is six) of the BTS 3900 LTE network element instance 1 is specifically as follows:
one-item alarm subsequence sets: A(4), E(3), C(4), G(2), B(3), D(4), F(2); and
two-item alarm subsequence sets: AE(2), AC(3), ECM, CG(1), CB(2), AG(1), AB(1), GB(2), BC(2).

The number in the brackets is the frequent alarm sequence count. For example, A(4) indicates that A occurs in four alarm sequences, and AE(2) indicates that A and E simultaneously occur in two alarm sequences.

Figure 17:
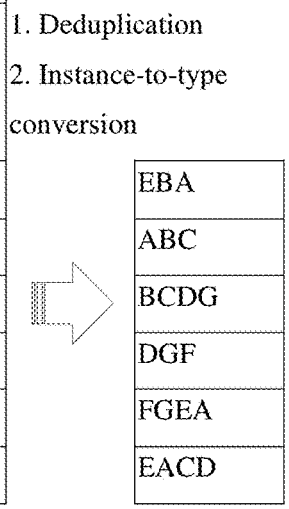
FIG. 17 is a schematic flowchart of sliding window modeling of a network element instance 2 according to an embodiment of the present invention.

Example two: FIG. 17 is a schematic flowchart of sliding window modeling of a network element instance 2 according to an embodiment of the present invention. As shown in the figure, an instance is converted into a sequence type through alarm sequence deduplication according to the method shown in FIG. 15 or in the foregoing specific frequent alarm sequence counting manner.

Similarly, a frequent alarm sequence count of a BTS 3900 LTE network element instance 2 of the same type is calculated by using the foregoing step 1 to step 3, to generate a frequent alarm sequence counting set (a quantity of alarm subsequences S1 to S6 is six). The frequent alarm sequence counting set is specifically as follows:
one-item alarm subsequence sets: E(3), B(3), A(4), C(3), D(3), G(3), F(2); and
two-item alarm subsequence sets: EB(1), EA(3), BA(2), AC(2), BC(2), BD(1), BG(1).

The frequent alarm sequence counts of the two network element instances (that is, the network element instance 1 and the network element instance 2) of the same network element type are summed and combined, to obtain a frequent alarm sequence counting set (a quantity of alarm subsequences is 12) of the BTS 3900 LTE network element type. The frequent alarm sequence counting set is specifically as follows:
one-item alarm subsequence sets (that is, frequent one-item alarm subsequence sets): A(8), E(6), C(7), G(5), B(6), D(7), F(4); and
two-item alarm subsequence sets (that is, frequent two-item alarm subsequence sets):
AE(5), AC(5), EC(1), CG(1), CB(4), AG(1), AB(3), GB(3), BC(2), EB(1), BD(1).

Step S1205: Generate the association rule based on an alarm subsequence whose confidence is greater than a preset threshold in the frequent two-item alarm subsequence set and a preset filtering method.

Specifically, alarm subsequence pairs that match an inclusion relationship are extracted from the frequent alarm subsequence sets that are obtained from the alarm sequence counting and that are of the network elements, and are combined to generate the association rule. A generation manner may include: obtaining alarm sequences that exceed a frequency threshold (that is, a preset threshold), and combining the alarm sequences to generate the association rule (or a target rule, where the target rule is an association rule that needs to be filtered with reference to a preset filtering method, and a filtered association rule is a final association rule, and when the preset filtering method is not set, the target rule is the final association rule). The confidence represents a ratio of a quantity of all alarm sequences that include an alarm 1 and an alarm 2 in an alarm subsequence set to a quantity of all alarm sequences that include the alarm 1 in the alarm subsequence set. In this embodiment of the present invention, the confidence is used as a generation condition of the association rule, and a part of redundant rules are filtered out, thereby improving credibility of the obtained association rule. For example, confidence of the two-item alarm subsequence set is calculated based on the frequent alarm sequence counting set. The BTS3900 LTE network element instance 1 is used as an example for description. A quantity of the alarm subsequence sets of the BTS3900 LTE network element instance 1 is six. The one-item alarm subsequence sets include A(4), E(3), C(4), G(2), B(3), D(4), F(2).

The two-item alarm subsequence sets include AE(2), AC(3), EC(1), CG(1), CB(2), AG(1), AB(1), GB(2), BC(2).

AE (5) is a frequent two-item alarm subsequence set. Assuming that a preset confidence threshold is 0.6, confidence of an association rule A→E is 2, which is a quantity of times for which A and E simultaneously occur, divided by 4, which is a quantity of times for which A occurs, that is, 2/4=0.5. Confidence of an association rule E→A is 2, which is a quantity of times for which A and E simultaneously occur, divided by 3, which is a quantity of times for which E occurs, that is, 2/3=0.6667. A finally obtained association rule is E→A.

In a possible implementation, the preset filtering method includes calculating first confidence of a first association rule and second confidence of a second association rule, where the first association rule and the second association rule are one or more pairs of association rules corresponding to a same alarm, and comparing the first confidence and the second confidence, to use an association rule whose confidence is greater as the association rule. In this embodiment of the present invention, the association rule whose confidence is greater (that is, a priority of the association rule is higher) is retained based on confidence of one or more pairs of association rules corresponding to the same alarm, so that a redundant rule is processed, a quantity of rules is reduced, and the association rule that is more accurate and more effective is retained. This helps subsequently use the association rule effectively. For example, the target rule is filtered and a rule that satisfies a redundancy type is removed. A filtering method may be for an alarm association rule generated based on a frequent alarm subsequence, if an association rule A→B and an association rule B→A both exist, a rule with higher confidence is selected.

Figure 18:
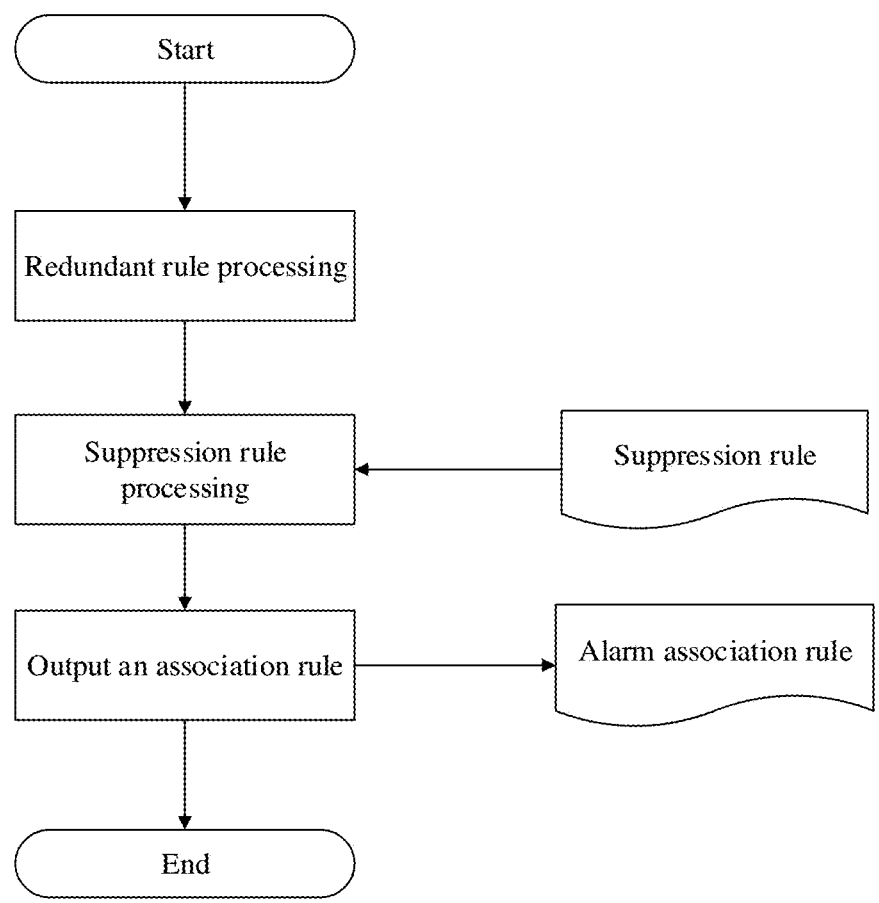
FIG. 18 is a schematic diagram of an association rule filtering procedure according to an embodiment of the present invention.

In a possible implementation, the alarm field further includes alarm location information, and the preset filtering method includes calculating first confidence of a first association rule and second confidence of a second association rule, where the first association rule and the second association rule are a plurality of pairs of association rules corresponding to a same alarm, comparing the first confidence and the second confidence, to obtain a plurality of third association rules whose confidence is greater in the first confidence and the second confidence, determining whether an alarm pair corresponding to a fourth association rule in the plurality of third association rules has the same alarm location information, where the fourth association rule is an association rule in which there is an association between each alarm in the corresponding alarm pair and a same alarm, if the alarm pair does not have the same alarm location information, suppressing the fourth association rule, and obtaining a plurality of third association rules other than the suppressed fourth association rule, to use the plurality of third association rules as the association rule. In this embodiment of the present invention, the redundant rule in the target rule is first processed, and then rule suppression processing is performed, and finally, a remaining rule is output as the final association rule. FIG. 18 is a schematic diagram of an association rule filtering procedure according to an embodiment of the present invention. After the redundant rule is processed, and rule suppression processing is performed, the association rule is output, so that quality of the association rule is improved, the redundant rule is reduced, and analysis efficiency is improved. For example, a rule is set to suppress an association rule corresponding to two alarms that have no common location parameter (that is, alarm location information). When an association rule A→B has a common location parameter, an association rule B→C has a common location parameter, and an association rule A→C has no common location parameter, the association rule A→C is suppressed. Similarly, when an association rule C→D has a common location parameter, an association rule B→D has no common location parameter, and an association rule A→D has no common location parameter, the association rule B→D and the association rule A→D are suppressed, and the rest can be deduced by analogy.

Step S1206: Determine M alarm pairs from the first alarm set according to the association rule.

Specifically, the M alarm pairs are finally determined in the process of generating the association rule and with reference to the generated association rule. Each alarm in the first alarm set includes a subsystem to which the alarm belongs and an alarm object corresponding to the alarm. In this embodiment of the present invention, the association between the alarms in the first alarm set is analyzed according to the association rule, to obtain the M alarm pairs. The association rule is obtained by accumulating expert knowledge and by learning based on the alarm association analysis. This ensures a relatively strong association between the two alarms in the alarm pair, and clears a correlative relationship between the alarms.

Step S1207: Generate, according to the association rule, a first feature set of N alarm pairs, in which the first alarm is used as an alarm pair root, in the M alarm pairs.

For details, refer to step S502.

Step S1208: Determine root information of the first alarm set based on the first probability and the second probability.

For details, refer to step S503.

In this embodiment of the present invention, the correlative relationship between the alarms in the alarm set is obtained, with reference to the fixed association rule obtained based on expert experience, by using the association rule obtained by analyzing the association between the alarms, and the probability that an alarm in the alarm pair is the root alarm and the association between the resource instances to which the alarm belong are mined based on the information such as the subsystems included in the alarms and the objects that generate the alarms. The root alarm is predicted by using the classification algorithm, to help perform association analysis from the plurality of dimensions such as the service association logic and the historical alarm data. The alarm data is filtered and compressed according to the association rule, to simplify the alarm data, thereby improving efficiency and accuracy of determining the alarm root cause. In this way, the association rule is updated and adjusted based on the key feature of the alarm set, and applicability of the association rule is enhanced. In addition, dependence on the expert knowledge is reduced, and secondary mining is performed on the alarm association rule, to implement system-level and device-level association analysis, thereby satisfying an actual requirement of telecommunication operation.

The foregoing describes in detail the method in the embodiments of the present invention, and the following provides a related apparatus in the embodiments of the present invention.

Figure 19:
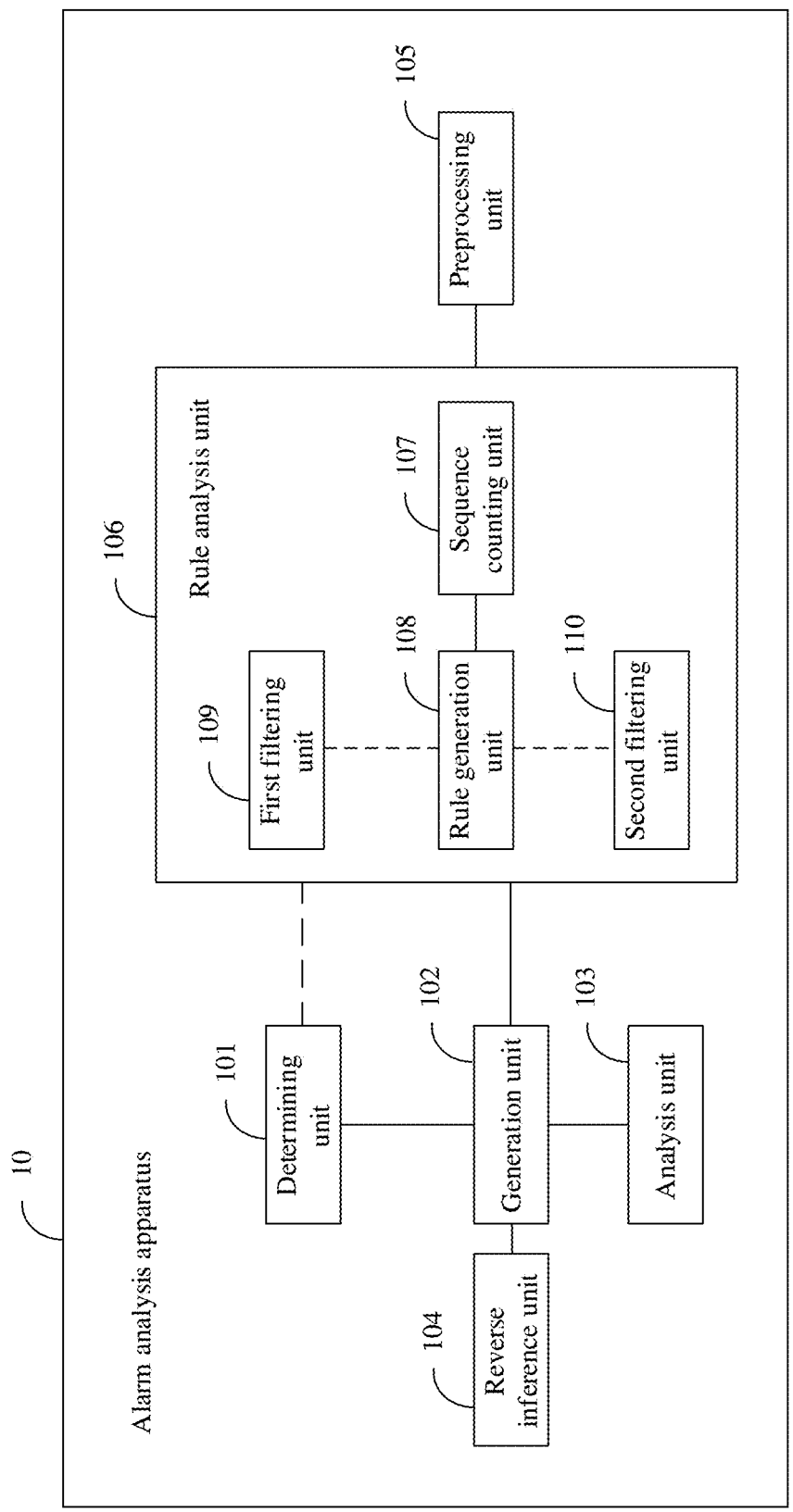
FIG. 19 is a schematic diagram of a structure of an alarm analysis apparatus according to an embodiment of the present invention.

FIG. 19 is a schematic diagram of a structure of an alarm analysis apparatus according to an embodiment of the present invention. The alarm analysis apparatus 10 includes a determining unit 101, a generation unit 102, an analysis unit 103, a reverse inference unit 104, a preprocessing unit 105, a rule analysis unit 106, a sequence counting unit 107, a rule generation unit 108, a first filtering unit 109, and a second filtering unit no. Optionally, the alarm analysis apparatus 10 may further include the reverse inference unit 104, the preprocessing unit 105, the rule analysis unit 106, the sequence counting unit 107, the rule generation unit 108, the first filtering unit 109, and the second filtering unit no. Details are as follows.

The determining unit 101 is configured to determine M alarm pairs in a first alarm set, where each of the M alarm pairs includes a first alarm and a second alarm between which an association exists, and M is an integer greater than 0.

The generation unit 102 is configured to generate, according to an association rule, a first feature set of N alarm pairs, in which the first alarm is used as an alarm pair root, in the M alarm pairs, where the first feature set includes a first probability that a first subsystem to which each first alarm in the N alarm pairs belongs is a subsystem root and a first alarm object corresponding to the first alarm is an alarm object root and a second probability that a second subsystem to which each second alarm belongs is a subsystem root and a second alarm object corresponding to the second alarm is an alarm object root, where N is an integer greater than 0 and less than M.

The analysis unit 103 is configured to determine root information of the first alarm set based on the first probability and the second probability, where the root information includes one or more of a root alarm, a root subsystem, and a root alarm object in the first alarm set.

In a possible implementation, the generation unit 102 is specifically configured to determine an alarm pair root of each of the M alarm pairs according to the association rule, count a quantity of times for which the first subsystem is the subsystem root and the first alarm object is the alarm object root, to calculate the first probability, and count a quantity of times for which the second subsystem is the subsystem root and the second alarm object is the alarm object root, to calculate the second probability, and obtain the first feature set of the N alarm pairs in which the first alarm is used as the alarm pair root.

In a possible implementation, the apparatus further includes the reverse inference unit 104, configured to determine a third subsystem to which a third alarm belongs and a third alarm object corresponding to the third alarm, and a fourth subsystem to which a fourth alarm belongs and a fourth alarm object corresponding to the fourth alarm, where the third alarm and the fourth alarm are any two alarms in a second alarm set, generate a second feature set of the M alarm pairs according to the association rule, determine, based on the second feature set, a first association between the third subsystem and the fourth subsystem and a second association between the third alarm object and the fourth alarm object, and determine, based on the first association and the second association, whether there is an association between the third alarm and the fourth alarm.

In a possible implementation, the root information includes the root alarm, the root subsystem, and the root alarm object in the first alarm set, and the analysis unit is 103 specifically configured to calculate the first probability and the second probability and perform classification on the first alarm set by using the first feature set as a training data set of a random forest algorithm, to obtain the root alarm, the root subsystem, and the root alarm object.

In a possible implementation, the determining unit 101 is specifically configured to determine the M alarm pairs in the first alarm set according to the association rule, where each alarm in the first alarm set includes a subsystem to which the alarm belongs and an alarm object corresponding to the alarm.

In a possible implementation, the apparatus further includes the preprocessing unit 105, configured to before the M alarm pairs are determined in the first alarm set according to the association rule, convert an alarm field of each raw alarm in a raw alarm set corresponding to the first alarm set into an integer field, where the alarm field includes one or more of an alarm object, an alarm source, alarm raised time, and alarm clear time, filter out a raw alarm whose alarm field is an invalid integer field, to obtain L standardized alarms, where L is an integer greater than 0, and determine a third alarm set, where the third alarm set includes the L standardized alarms.

In a possible implementation, the standardized alarm includes a network element type, and the apparatus further includes the rule analysis unit 106, including the sequence counting unit 107 and the rule generation unit 108, where the sequence counting unit 107 is configured to perform, after the third alarm set is determined, sliding window modeling on the L standardized alarms, to obtain a frequent alarm subsequence set of K network element types, where K is an integer greater than 0, and the frequent alarm subsequence set includes a frequent one-item alarm subsequence set and a frequent two-item alarm subsequence set, and the rule generation unit 108 is configured to generate the association rule based on an alarm subsequence whose confidence is greater than a preset threshold in the frequent two-item alarm subsequence set and a preset filtering method.

In a possible implementation, the standardized alarm further includes the alarm source and the alarm raised time, and the sequence counting unit 107 is specifically configured to obtain, based on network element types and alarm sources of the L standardized alarms, fifth alarms sent by same alarm sources of a same network element type, sort the fifth alarms in ascending order based on alarm raised time of each of the fifth alarms, obtain P alarm sequences based on a preset sliding window width and a sliding step by using a constructed sliding window, where the alarm sequence includes one or more fifth alarms in the same sliding window, and P is an integer greater than 0, count a quantity of times for which an alarm subsequence included in the P alarm sequences occurs, to obtain a frequent alarm subsequence set of the same alarm sources, and separately accumulate frequent alarm subsequence sets of different alarm sources of the same network element type, to obtain the frequent alarm subsequence set of the K network element types.

In a possible implementation, the apparatus further includes the first filtering unit 109, configured to calculate first confidence of a first association rule and second confidence of a second association rule, where the first association rule and the second association rule are one or more pairs of association rules corresponding to a same alarm, and compare the first confidence and the second confidence, to use an association rule whose confidence is greater as the association rule.

In a possible implementation, the alarm field further includes alarm location information, and the apparatus further includes the second filtering unit 110, configured to calculate first confidence of a first association rule and second confidence of a second association rule, where the first association rule and the second association rule are a plurality of pairs of association rules corresponding to a same alarm, compare the first confidence and the second confidence, to obtain a plurality of third association rules whose confidence is greater in the first confidence and the second confidence, determine whether an alarm pair corresponding to a fourth association rule in the plurality of third association rules has the same alarm location information, where the fourth association rule is an association rule in which there is an association between each alarm in the corresponding alarm pair and a same alarm, if the alarm pair does not have the same alarm location information, suppress the fourth association rule, and obtain a plurality of third association rules other than the suppressed fourth association rule, to use the plurality of third association rules as the association rule.

It should be noted that, for the alarm analysis apparatus described in this embodiment of the present invention, refer to related descriptions of the alarm analysis method in the method embodiments described in FIG. 5 and FIG. 12. Details are not described herein again.

Figure 20:
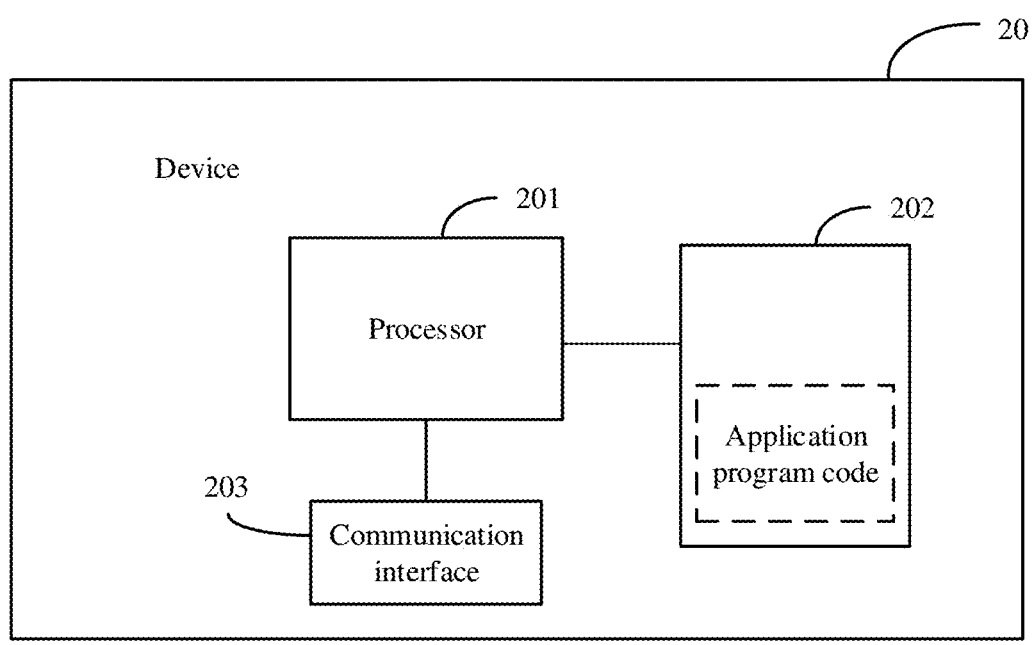
FIG. 20 is a schematic diagram of a structure of a device according to an embodiment of the present invention.

FIG. 20 is a schematic diagram of a structure of a device according to an embodiment of the present invention. The alarm analysis apparatus 10 may be implemented by using a structure in FIG. 20. The device 20 includes at least one processor 201, at least one memory 202, and at least one communication interface 203. In addition, the device may further include general-purpose components such as an antenna, and details are not described herein.

The processor 201 may be a general-purpose central processing unit (CPU), a microprocessor, an application-specific integrated circuit (ASIC), or one or more integrated circuits for controlling program execution of the foregoing solutions.

The communication interface 203 is configured to communicate with another device or a communication network.

The memory 202 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer. However, the memory is not limited thereto. The memory may exist independently, and is connected to a processor through a bus. The memory may alternatively be integrated with the processor.

The memory 202 is configured to store application program code for executing the foregoing solutions, and the processor 201 controls execution. The processor 201 is configured to execute the application program code stored in the memory 202.

When the device shown in FIG. 19 is an alarm analysis apparatus, the code stored in the memory 202 may execute the alarm analysis method provided in FIG. 5 or FIG. 12, for example, determine M alarm pairs in a first alarm set, generate, according to an association rule, a first feature set of N alarm pairs, in which a first alarm is used as an alarm pair root, in the M alarm pairs, and determine root information of the first alarm set based on a first probability and a second probability.

It should be noted that, for the function of the device 20 described in this embodiment of the present invention, refer to related descriptions of the method embodiments described in FIG. 5 and FIG. 12. Details are not described herein again.

An embodiment of the present invention further provides a computer storage medium. The computer storage medium may store a program, and when the program is executed, a part or all of the steps described in the method embodiments corresponding to FIG. 1 to FIG. 18 may be performed.

An embodiment of the present invention further provides a computer program. The computer program includes instructions. When the computer program is executed by a computer, the computer is enabled to perform a part or all of the steps described in the method embodiments corresponding to FIG. 1 to FIG. 18.

An embodiment of the present invention further provides a server. The server includes a processor and a memory. The processor invokes executable program code stored in the memory, to perform a part or all of the steps described in the method embodiments corresponding to FIG. 1 to FIG. 18.

In the foregoing embodiments, descriptions of the embodiments have respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should further be appreciated by a person skilled in the art that the embodiments described in this specification all belong to preferred embodiments, and the involved actions and modules are not necessarily required in this application.

In the several embodiments provided in this application, it should be understood that the disclosed apparatuses may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate pails may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like, and may be specifically a processor in the computer device) to perform all or some of the steps of the methods described in the embodiments of this application. The storage medium may include any medium that can store program code, such as a USB flash drive, a removable hard disk, a magnetic disk, an optical disc, a read-only memory (Read-Only Memory, ROM for short), or a random access memory (Random Access Memory, RAM for short).

The foregoing descriptions are merely specific implementations of the present invention, but are not intended to limit the protection scope of the present invention. Any variation or replacement readily figured out by the person skilled in the art within the technical scope disclosed in the present invention shall fall within the protection scope of the present invention. Therefore, the protection scope of the present invention shall be subject to the protection scope of the claims.

What is claimed is:

1. An alarm analysis method, comprising:
   determining M alarm pairs in a first alarm set, wherein each alarm pair of the M alarm pairs comprises a first alarm and a second alarm between which an association exists, and wherein M is an integer greater than 0;
   generating, according to an association rule, a first feature set of N alarm pairs of the M alarm pairs, wherein the first alarm of each alarm pair of the N alarm pairs is used as an alarm pair root in the first feature set, wherein the first feature set comprises a first probability that a first subsystem to which each first alarm in the N alarm pairs belongs is a subsystem root and a first alarm object corresponding to the first alarm is an alarm object root and further comprises a second probability that a second subsystem to which each second alarm of the N alarm pairs belongs is a subsystem root and a second alarm object corresponding to the second alarm is an alarm object root, and wherein N is an integer greater than 0 and less than M; and
   determining root information of the first alarm set based on the first probability and the second probability, wherein the root information comprises one or more of a root alarm, a root subsystem, or a root alarm object in the first alarm set.

2. The method according to claim 1, wherein the generating the first feature set of the N alarm pairs comprises:
   determining an alarm pair root of each of the M alarm pairs according to the association rule;
   calculating the first probability by determining a quantity of times for which the first subsystem is the subsystem root and the first alarm object is the alarm object root; and calculating the second probability by determining a quantity of times for which the second subsystem is the subsystem root and the second alarm object is the alarm object root; and obtaining the first feature set of the N alarm pairs in which the first alarm is used as the alarm pair root.

3. The method according to claim 1, further comprising:
determining a third subsystem to which a third alarm belongs and a third alarm object corresponding to the third alarm;
determining a fourth subsystem to which a fourth alarm belongs and a fourth alarm object corresponding to the fourth alarm, wherein the third alarm and the fourth alarm are any two alarms in a second alarm set;
generating a second feature set of the M alarm pairs according to the association rule, wherein the second feature set comprises a first probability that a first subsystem to which each first alarm in the M alarm pairs belongs is a subsystem root and a first alarm object corresponding to the first alarm is an alarm object root and further comprises a second probability that a second subsystem to which each second alarm belongs is a subsystem root and a second alarm object corresponding to the second alarm is an alarm object root;
determining, based on the second feature set, a first association between the third subsystem and the fourth subsystem and a second association between the third alarm object and the fourth alarm object; and
determining, based on the first association and the second association, whether there is an association between the third alarm and the fourth alarm.

4. The method according to claim 1, wherein the root information comprises the root alarm, the root subsystem, and the root alarm object in the first alarm set; and
wherein the determining the root information of the first alarm set based on the first probability and the second probability comprises:
determining the root alarm, the root subsystem, and the root alarm object by calculating the first probability and the second probability and performing classification on the first alarm set using the first feature set as a training data set of a random forest algorithm.

5. The method according to claim 1, wherein the determining M alarm pairs in a first alarm set comprises:
determining the M alarm pairs in the first alarm set according to the association rule, wherein each alarm in the first alarm set comprises a subsystem to which the alarm belongs and further comprises an alarm object corresponding to the alarm.

6. The method according to claim 5, further comprising performing, before the determining the M alarm pairs in the first alarm set according to the association rule, the method further comprises:
converting an alarm field of each raw alarm in a raw alarm set corresponding to the first alarm set into an integer field, wherein the alarm field comprises one or more of an alarm object, an alarm source, an alarm raised time, or an alarm clear time;
obtaining L standardized alarms by filtering out a raw alarm whose alarm field is an invalid integer field, wherein L is an integer greater than 0; and
determining a third alarm set, wherein the third alarm set comprises the L standardized alarms.

7. The method according to claim 6, wherein the standardized alarm comprises a network element type; and wherein the method further comprises performing, after the determining the third alarm set:
obtaining a frequent alarm subsequence set of K network element types by performing sliding window modeling on the L standardized alarms, wherein K is an integer greater than 0, and wherein the frequent alarm subsequence set comprises a frequent one-item alarm subsequence set and a frequent two-item alarm subsequence set; and
generating the association rule based on an alarm subsequence whose confidence is greater than a preset threshold in the frequent two-item alarm subsequence set and a preset filtering method.

8. The method according to claim 7, wherein the standardized alarm further comprises the alarm source and the alarm raised time; and
wherein the performing sliding window modeling on the L standardized alarms, to obtain a frequent alarm subsequence set of K network element types comprises:
obtaining, based on network element types and alarm sources of the L standardized alarms, fifth alarms sent by same alarm sources of a same network element type;
sorting the fifth alarms in ascending order based on alarm raised time of each of the fifth alarms;
obtaining P alarm sequences based on a preset sliding window width and a sliding step by using a constructed sliding window, wherein the alarm sequence comprises one or more fifth alarms in the same sliding window, and wherein P is an integer greater than 0;
obtaining a frequent alarm subsequence set of the same alarm sources by determining a quantity of times for which an alarm subsequence comprised in the P alarm sequences occurs; and
obtaining the frequent alarm subsequence set of the K network element types by separately accumulating frequent alarm subsequence sets of different alarm sources of the same network element type.

9. The method according to claim 7, wherein the preset filtering method comprises:
calculating a first confidence of a first association rule and a second confidence of a second association rule, wherein the first association rule and the second association rule are one or more pairs of association rules corresponding to a same alarm; and
using, as the association rule, an association rule whose confidence is greater, which is determined by comparing the first confidence and the second confidence.

10. The method according to claim 7, wherein the alarm field further comprises alarm location information; and
wherein the preset filtering method comprises:
calculating a first confidence of a first association rule and a second confidence of a second association rule, wherein the first association rule and the second association rule are a plurality of association rules of pairs of association rules corresponding to a same alarm;
obtaining a plurality of third association rules whose confidence is greater in the first confidence and the second confidence by comparing the first confidence and the second confidence;
determining whether an alarm pair corresponding to a fourth association rule in the plurality of third association rules has the same alarm location information, wherein the fourth association rule is an association rule in which there is an association between each alarm in the corresponding alarm pair and a same alarm;

suppressing the fourth association rule in response to the alarm pair not having the same alarm location information; and using a plurality of third association rules as the association rule by obtaining a plurality of third association rules other than the suppressed fourth association rule.

11. An alarm analysis apparatus, comprising:

a processor; and a non-transitory memory coupled to the processor and storing instructions that, when executed by the processor, cause the apparatus to:

determine M alarm pairs in a first alarm set, wherein each alarm pair of the M alarm pairs comprises a first alarm and a second alarm between which an association exists, and wherein M is an integer greater than 0;

generate, according to an association rule, a first feature set of N alarm pairs of the M alarm pairs, wherein the first alarm of each alarm pair of the N alarm pairs is used as an alarm pair root in the first feature set, wherein the first feature set comprises a first probability that a first subsystem to which each first alarm in the N alarm pairs belongs is a subsystem root and a first alarm object corresponding to the first alarm is an alarm object root and a second probability that a second subsystem to which each second alarm of the N alarm pairs belongs is a subsystem root and a second alarm object corresponding to the second alarm is an alarm object root, and wherein N is an integer greater than 0 and less than M; and determine root information of the first alarm set based on the first probability and the second probability, wherein the root information comprises one or more of a root alarm, a root subsystem, or a root alarm object in the first alarm set.

12. The apparatus according to claim 11, wherein the instructions, when executed by the processor, further cause the apparatus to:

determine an alarm pair root of each of the M alarm pairs according to the association rule;

calculate the first probability by determining a quantity of times for which the first subsystem is the subsystem root and the first alarm object is the alarm object root;

calculate the second probability by determining a quantity of times for which the second subsystem is the subsystem root and the second alarm object is the alarm object root; and obtain the first feature set of the N alarm pairs in which the first alarm is used as the alarm pair root.

13. The apparatus according to claim 11, wherein the instructions, when executed by the processor, further cause the apparatus to:

determine a third subsystem to which a third alarm belongs and a third alarm object corresponding to the third alarm;

determine a fourth subsystem to which a fourth alarm belongs and a fourth alarm object corresponding to the fourth alarm, wherein the third alarm and the fourth alarm are any two alarms in a second alarm set;

generate a second feature set of the M alarm pairs according to the association rule;

determine, based on the second feature set, a first association between the third subsystem and the fourth subsystem and a second association between the third alarm object and the fourth alarm object; and determine, based on the first association and the second association, whether there is an association between the third alarm and the fourth alarm.

14. The apparatus according to claim 11, wherein the root information comprises the root alarm, the root subsystem, and the root alarm object in the first alarm set; and wherein the instructions, when executed by the processor, further cause the apparatus to:

obtain the root alarm, the root subsystem, and the root alarm object by calculate the first probability and the second probability and performing classification on the first alarm set using the first feature set as a training data set of a random forest algorithm.

15. The apparatus according to claim 11, wherein the instructions, when executed by the processor, cause the apparatus to:

determine the M alarm pairs in the first alarm set according to the association rule, wherein each alarm in the first alarm set comprises a subsystem to which the alarm belongs and an alarm object corresponding to the alarm.

16. The apparatus according to claim 15, wherein the instructions, when executed by the processor, further cause the apparatus to perform, before the M alarm pairs are determined in the first alarm set according to the association rule:

convert an alarm field of each raw alarm in a raw alarm set corresponding to the first alarm set into an integer field, wherein the alarm field comprises one or more of an alarm object, an alarm source, an alarm raised time, or an alarm clear time;

filter out a raw alarm whose alarm field is an invalid integer field, to obtain L standardized alarms, wherein L is an integer greater than 0; and determine a third alarm set, wherein the third alarm set comprises the L standardized alarms.

17. The apparatus according to claim 16, wherein the standardized alarm comprises a network element type; and wherein the instructions, when executed by the processor, cause the apparatus to:

perform, after the third alarm set is determined, sliding window modeling on the L standardized alarms, to obtain a frequent alarm subsequence set of K network element types, wherein K is an integer greater than 0, and the frequent alarm subsequence set comprises a frequent one-item alarm subsequence set and a frequent two-item alarm subsequence set; and generate the association rule based on an alarm subsequence whose confidence is greater than a preset threshold in the frequent two-item alarm subsequence set and a preset filtering method.

18. The apparatus according to claim 17, wherein the standardized alarm further comprises the alarm source and the alarm raised time; and wherein the instructions, when executed by the processor, further cause the apparatus to:

obtain, based on network element types and alarm sources of the L standardized alarms, fifth alarms sent by same alarm sources of a same network element type;

sort the fifth alarms in ascending order based on alarm raised time of each of the fifth alarms;

obtain P alarm sequences based on a preset sliding window width and a sliding step by using a constructed sliding window, wherein the alarm sequence comprises one or more fifth alarms in the same sliding window, and wherein P is an integer greater than 0;

obtain a frequent alarm subsequence set of the same alarm sources by determining a quantity of times for which an alarm subsequence comprised in the P alarm sequences occurs; and obtain the frequent alarm subsequence set of the K network element types by separately accumulating frequent alarm subsequence sets of different alarm sources of the same network element type.

19. The apparatus according to claim 17, wherein the instructions, when executed by the processor, cause the apparatus to:

calculate first confidence of a first association rule and second confidence of a second association rule, wherein the first association rule and the second association rule are one or more pairs of association rules corresponding to a same alarm; and compare the first confidence and the second confidence, to use an association rule whose confidence is greater as the association rule.

20. The apparatus according to claim 17, wherein the alarm field further comprises alarm location information; and wherein the instructions, when executed by the processor, cause the apparatus to:

calculate first confidence of a first association rule and second confidence of a second association rule, wherein the first association rule and the second association rule are a plurality of pairs of association rules corresponding to a same alarm;

obtain a plurality of third association rules whose confidence is greater in the first confidence and the second confidence by comparing the first confidence and the second confidence;

determine whether an alarm pair corresponding to a fourth association rule in the plurality of third association rules has the same alarm location information, wherein the fourth association rule is an association rule in which there is an association between each alarm in the corresponding alarm pair and a same alarm;

suppress the fourth association rule in response to the alarm pair not having the same alarm location information; and use the plurality of third association rules as the association rule by obtaining a plurality of third association rules other than the suppressed fourth association rule.

* * * * *